(12) United States Patent
Funayama

(10) Patent No.: US 9,064,122 B2
(45) Date of Patent: Jun. 23, 2015

(54) JOB PROCESSING SYSTEM, JOB PROCESSING METHOD, AND NON-TRANSITORY COMPUTER-READABLE MEDIUM

(71) Applicant: CANON KABUSHIKI KAISHA, Tokyo (JP)

(72) Inventor: Hirotaka Funayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/950,734

(22) Filed: Jul. 25, 2013

(65) Prior Publication Data

US 2014/0044259 A1 Feb. 13, 2014

(30) Foreign Application Priority Data

Aug. 8, 2012 (JP) ................................ 2012-176373

(51) Int. Cl.
*G06F 21/60* (2013.01)
(52) U.S. Cl.
CPC ............ *G06F 21/602* (2013.01); *G06F 21/608* (2013.01)
(58) Field of Classification Search
CPC .................................................. H04N 1/4486
USPC .......................................................... 380/243
See application file for complete search history.

(56) References Cited

U.S. PATENT DOCUMENTS

| 7,383,462 B2 * | 6/2008 | Osaki et al. ...................... 714/2 |
| 2002/0178353 A1 * | 11/2002 | Graham ........................ 713/151 |
| 2011/0066862 A1 * | 3/2011 | Sugimoto ..................... 713/189 |
| 2014/0002845 A1 * | 1/2014 | Gutnik et al. ................ 358/1.14 |

FOREIGN PATENT DOCUMENTS

JP 8-316951 A 11/1996

* cited by examiner

*Primary Examiner* — Kambiz Zand
*Assistant Examiner* — Thanh Le
(74) *Attorney, Agent, or Firm* — Fitzpatrick, Cella, Harper & Scinto

(57) ABSTRACT

A system for processing a job including one or a plurality of tasks, comprises: a management service server which manages a job generated by receiving the designation; and one or a plurality of task processing service servers which process one or a plurality of tasks forming the job, in order to execute processing based on the job, the management service server comprises: holding unit which holds, for each of the service servers, encryption information defining a method of encrypting and to decrypt a file corresponding to the job, and information which is used when generating a key for use in encryption and decryption; and specification unit which specifies, when receiving encryption information acquisition request, encryption information for a service server of a job corresponding to an encrypted file to be decrypted by the task processing service server.

18 Claims, 28 Drawing Sheets

FIG. 9

| USER ID 901 | TICKET ID 902 | ROUTE ID 903 | PARAMETERS 904 |
|---|---|---|---|
| user1 | 00001 | 001 | Width:100,Height:200,FolderPath:¥User¥user1¥ |
| user2 | 00002 | 002 | Uri:http://cloudservice1/document/ accessToken:abcdefghijklmn1212121212, expires_in:2011/12/31 12:00:00 |
| user1 | 00003 | 003 | |
| user3 | 00004 | 002 | Uri:http://cloudservice2/document/ accessToken:opqrstuvw1212121212, expires_in:2011/1/1 12:00:00 |
| user4 | 00005 | 003 | |
| user5 | 00006 | 003 | |

| 503 | 1001 | 1002 | 1003 |
|---|---|---|---|
| | TEMPLATE ID | TEMPLATE NAME | ROUTE ID |
| | 01 | SCAN TO CLOUD 1 | 001 |
| | 02 | SCAN TO CLOUD 2 | 002 |
| | 03 | JPEG TO CLOUD 1 | 003 |

| 604 | 1011 | 1012 | 1013 |
|---|---|---|---|
| | TEMPLATE ID | TEMPLATE NAME | ROUTE ID |
| | 01 | FAX TRANSMISSION OF JPEG | 001 |
| | 02 | FAX TRANSMISSION OF DOCUMENT | 002 |
| | 03 | FAX TRANSMISSION AFTER IMAGE PROCESSING | 003 |

F I G. 11
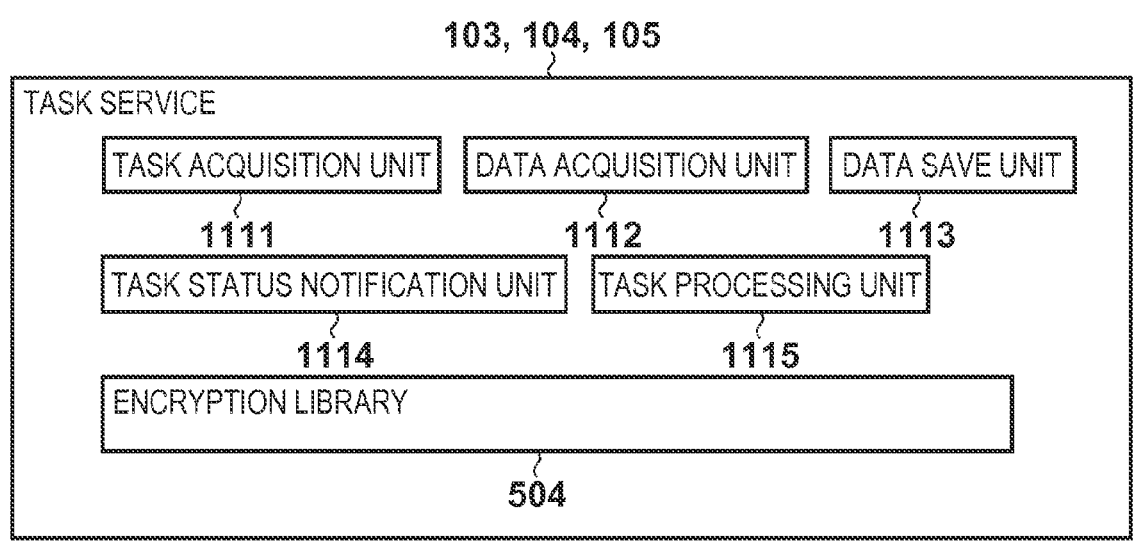

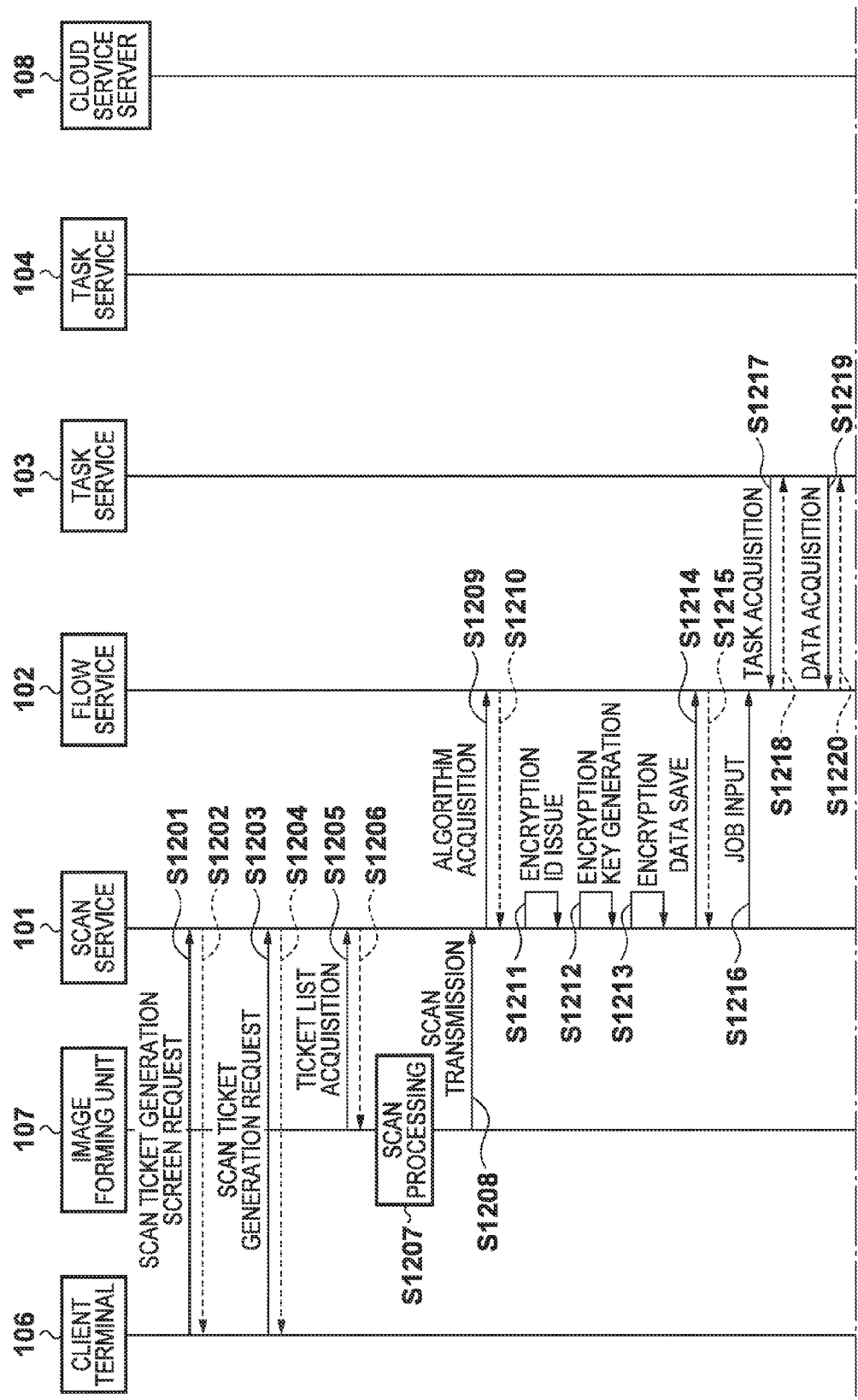

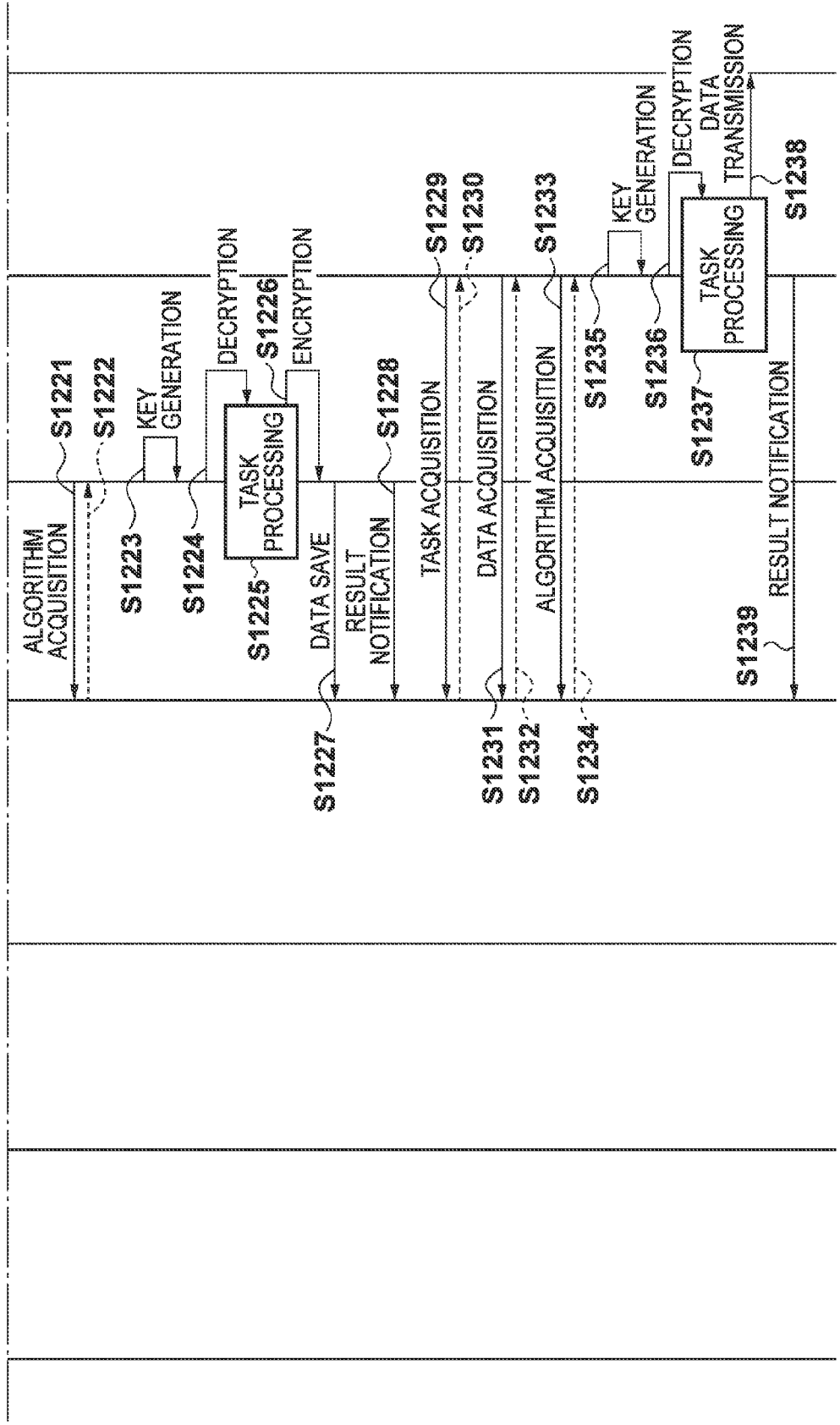

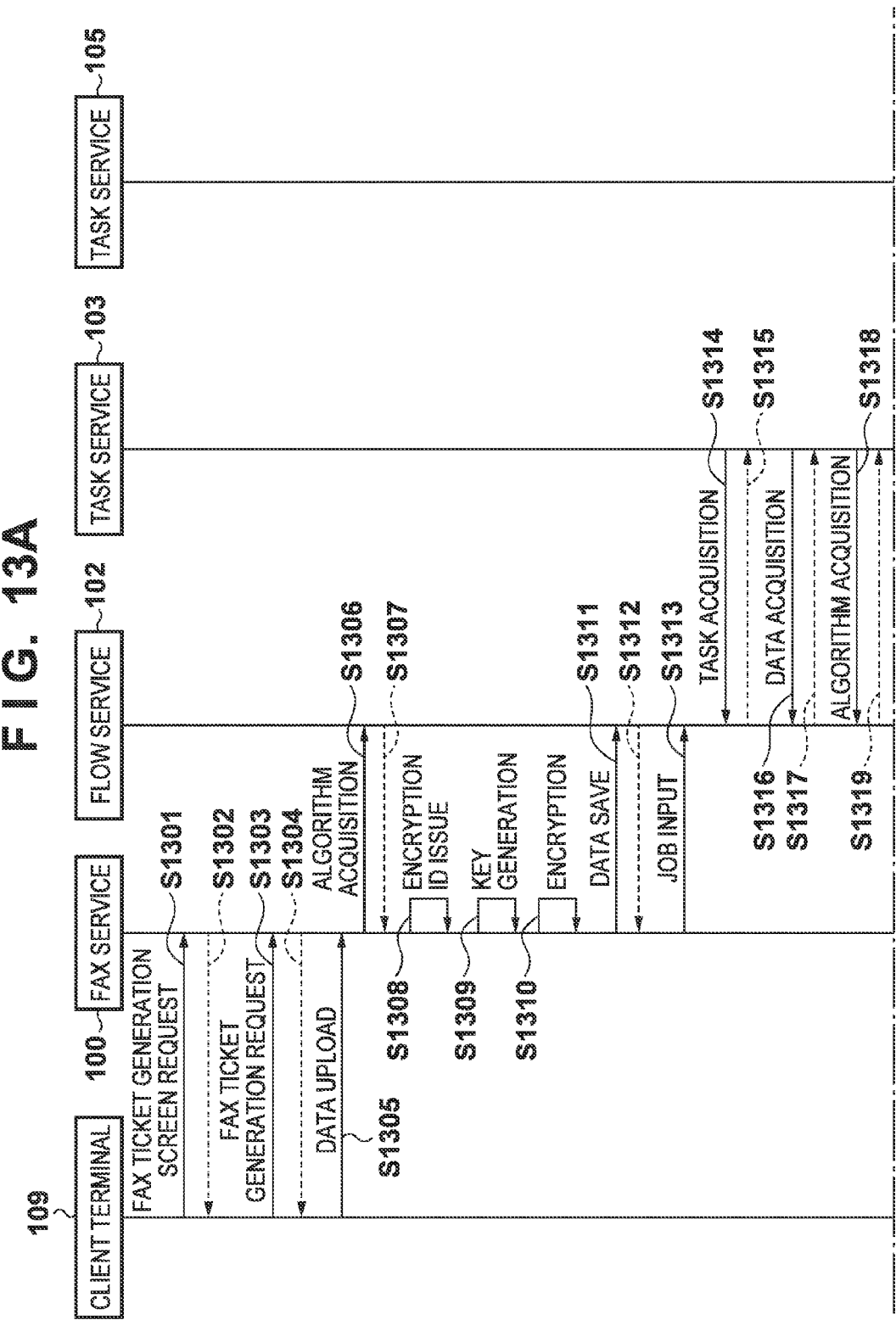

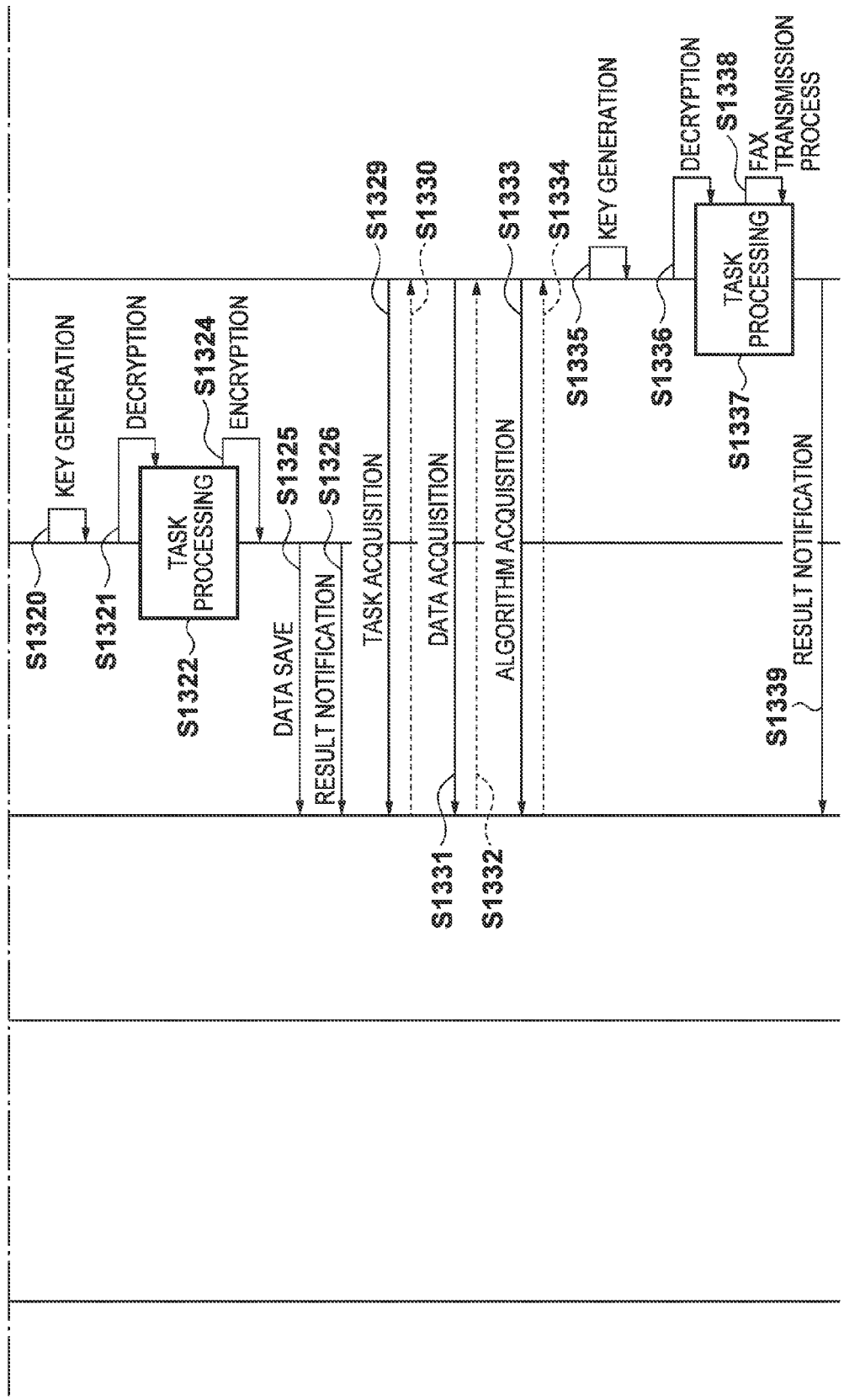

FIG. 16

| ROUTE ID | SEQUENCE NUMBER | TASK ID | |
|---|---|---|---|
| 001 | 1 | Task9 | ~1604 |
| 001 | 2 | Task2 | ~1605 |
| 002 | 1 | Task1 | ~1606 |
| 002 | 2 | Task3 | ~1607 |
| 002 | 3 | Task5 | ~1608 |
| 002 | 4 | Task7 | ~1609 |
| 003 | 1 | Task2 | ~1610 |

| TASK ID 1701 | TASK NAME 1702 | RETRY COUNT UPPER LIMIT 1703 |
|---|---|---|
| Task1 | PDF-TO-PDL CONVERSION | 3 |
| Task2 | SAVE IN CLOUD 1 | 3 |
| Task3 | DATA CONVERSION SERVICE COOPERATION | 3 |
| Task4 | SAVE IN CLOUD 2 | 2 |
| Task5 | DATA ACQUISITION FROM CLOUD 1 | 1 |
| Task6 | PDF-TO-JPEG CONVERSION | 1 |
| Task7 | SAVE IN CLOUD 3 | 3 |
| Task8 | SCAN DATA SAVE | 3 |
| Task9 | IMAGE PROCESSING | 2 |
| Task10 | FAX TRANSMISSION | 3 |

FIG. 20A

| 2001 | 2002 | 2003 | 2004 | 2005 | 2006 | 2007 | 2008 |
|---|---|---|---|---|---|---|---|
| JOB ID | ROUTE ID | FILE GROUP ID | CURRENT TASK ID | STATUS | LAST UPDATE TIME | PARAMETERS | ENCRYPTION METHOD ID |
| 1 | 001 | Job1 | Task9 | 0 | 2011/09/15 12:00:00 | Width:100,Height:200,FolderPath:¥User¥user1¥ | 001 |
| 2 | 002 | Job2 | Task1 | 0 | 2011/09/15 12:30:00 | Uri:http://cloudservice1/document/ accessToken:opqrstuvw121212121212, expires_in:2011/12/31 12:00:00 | 002 |
| 3 | 003 | Job3 | Task2 | 1 | 2011/09/15 13:00:00 | | 001 |
| 4 | 002 | Job4 | Task5 | 2 | 2011/09/15 12:40:00 | Uri:http://cloudservice2/document/ accessToken:opqrstuvw121212121212, expires_in:2011/1/1 12:00:00" | 002 |

| 2009 | 2010 | 2011 | 2012 | 2013 |
|---|---|---|---|---|
| JOB RETRY COUNT UPPER LIMIT | JOB RETRY COUNT | CURRENT TASK RETRY COUNT | TENANT ID | ENCRYPTION ID |
| 1 | 0 | 0 | TenantA | 012AABB |
| 2 | 0 | 0 | TenantB | 234BBCC |
| 0 | 0 | 0 | TenantB | 345CCDD |
| 2 | 1 | 0 | TenantC | 456DDEE |

FIG. 20B

| ENCRYPTION METHOD ID | ENCRYPTION METHOD | KEY LENGTH | ENCRYPTION KEY GENERATION METHOD |
|---|---|---|---|
| 001 | AES | 128 | METHOD A |
| 002 | AES | 128 | METHOD B |
| 003 | AES | 256 | METHOD A |
| 004 | AES | 256 | METHOD B |
| 005 | DES | 64 | METHOD A |
| 006 | DES | 64 | METHOD B |

2021  2022  2023  2024

F I G. 23A

| ID 2301 | HOST NAME 2302 | ACTIVE FLAG 2303 | SHARED FOLDER NAME 2304 |
|---|---|---|---|
| 01 | ServerA.host.co.jp | True | Shared | 2305
| 02 | ServerB.host.co.jp | True | Shared | 2306
| 03 | ServerC.host.co.jp | False | Shared | 2307

...

F I G. 23B

| FILE ID 2310 | FILE GROUP ID 2311 | TASK ID 2312 | No 2313 | PATH 2314 | HOST NAME 2315 | FORMATION DATE 2316 | EFFECTIVE PERIOD 2317 | TENANT ID 2318 |
|---|---|---|---|---|---|---|---|---|
| 0001 | Job1 | Folder | 1 | \\ServerA\Job1 | ServerA | 2011/1/1 0:01 | 2011/1/8 0:01 | TenantA |
| 0002 | Job1 | Folder | 1 | \\ServerB\Job1 | ServerB | 2011/1/1 0:01 | 2011/1/8 0:01 | TenantA |
| 0003 | Job1 | init | 1 | \\ServerA\Job1\init\1.pdf | ServerA | 2011/1/1 0:02 | 2011/1/8 0:02 | TenantA |
| 0004 | Job1 | init | 1 | \\ServerB\Job1\init\2.pdf | ServerB | 2011/1/1 0:02 | 2011/1/8 0:02 | TenantA |
| 0005 | Job1 | Task1 | 1 | \\ServerA\Job1\Task1\1.pdf | ServerA | 2011/1/1 0:03 | 2011/1/8 0:03 | TenantA |
| 0006 | Job1 | Task1 | 2 | \\ServerA\Job1\Task1\2.pdf | ServerA | 2011/1/1 0:03 | 2011/1/8 0:03 | TenantA |
| 0007 | Job2 | Folder | 1 | \\ServerC\Job2 | ServerC | 2011/1/1 0:10 | 2011/1/8 0:10 | TenantB |

...

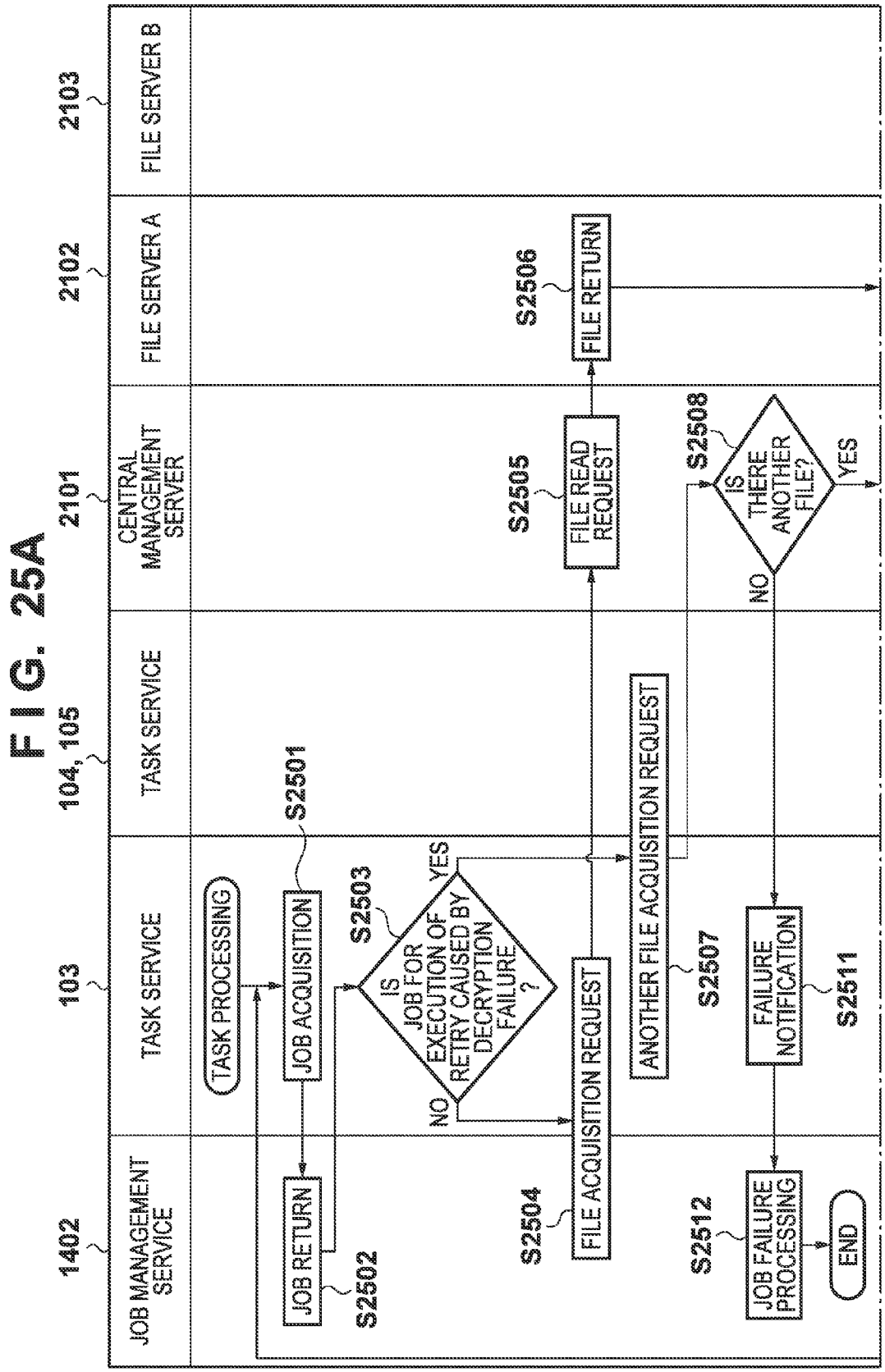

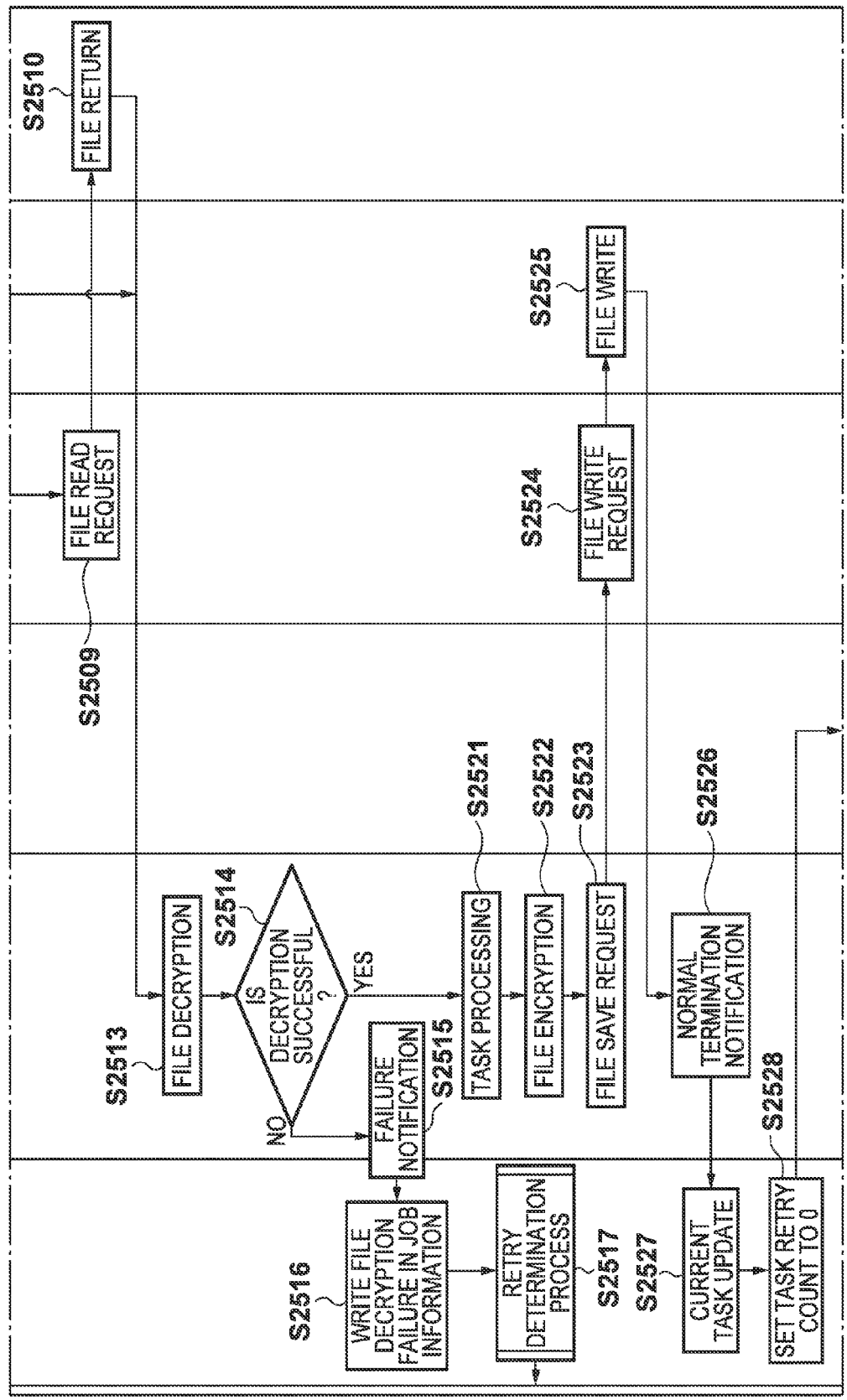

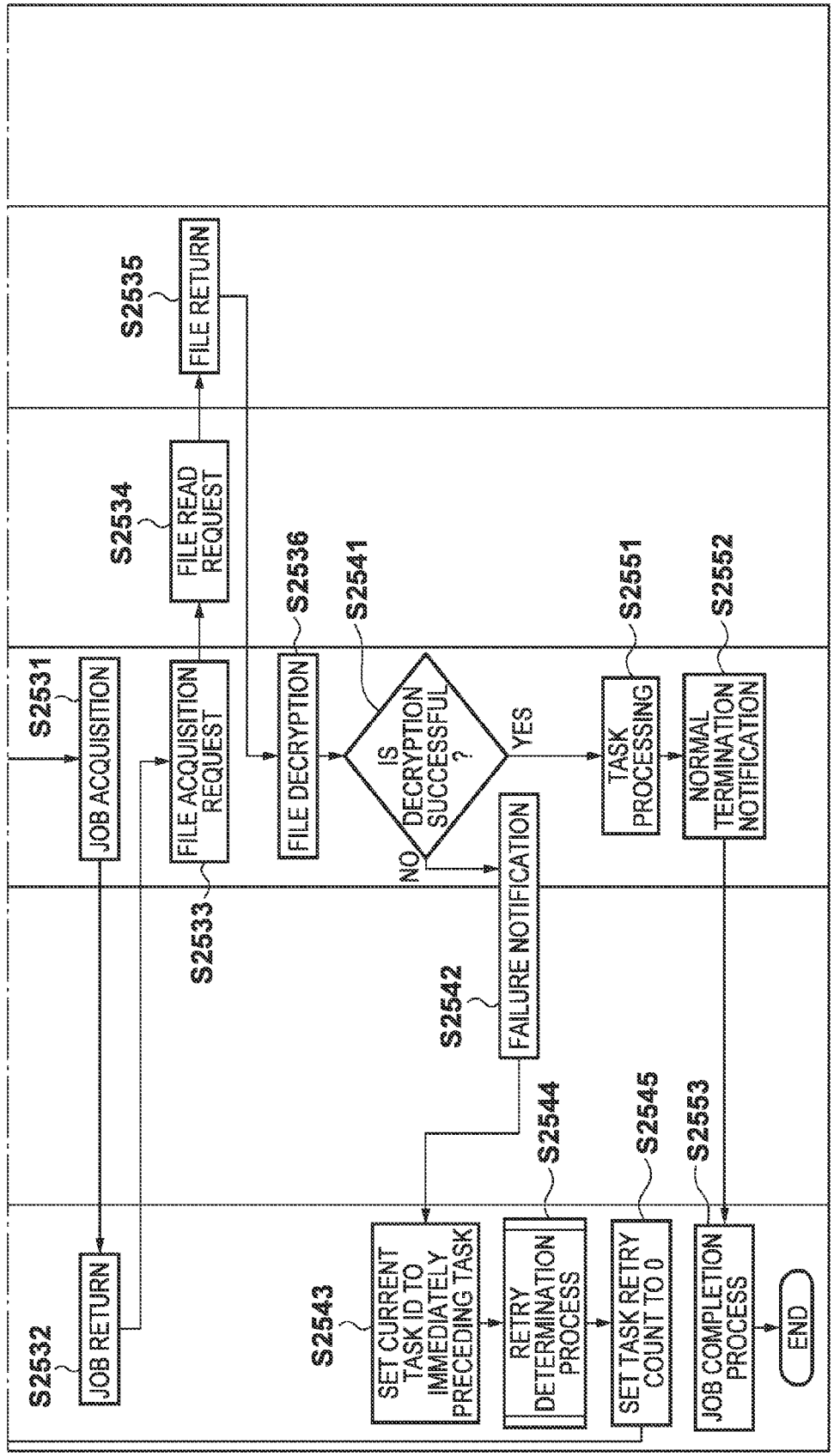

JOB PROCESSING SYSTEM, JOB PROCESSING METHOD, AND NON-TRANSITORY COMPUTER-READABLE MEDIUM

BACKGROUND OF THE INVENTION

1. Field of the Invention

The present invention relates to a job processing system, job processing method, and non-transitory computer-readable medium. The present invention particularly relates to the control of job encryption in job processing.

2. Description of the Related Art

Recently, a technique such as a cloud computing system or SaaS (Software as a Service) is used as a form of performing various processes on a server computer. In cloud computing, requests from many clients can be processed at the same time by executing data conversion and data processing by distributing them by using many computing resources. In addition, to fully utilize this feature of the cloud computing, there is a technique that implements a series of processes on a server by connecting finely defined tasks, and simultaneously processes the tasks in parallel, thereby scalably processing a large number of jobs.

In the above processing, temporary data generated by data conversion and data processing in individual tasks are separately managed for each tenant indicating a user's group. Since physically separating data for each server or the like requires a very high cost, data is managed in a tenant logically separated by designating the tenant ID when the data is saved and acquired.

When managing data for each tenant, the security can be improved by encrypting the data by using the tenant ID.

Japanese Patent Laid-Open No. 8-316951 has disclosed audio data wireless communication in which a plurality of encryption methods and identifiers for uniquely identifying them are managed by using a table. When performing encryption or decryption, an encryption method corresponding to the identifier is specified from the table, and encryption or decryption is performed using the encryption method. Since data to be transmitted by wireless communication contains encrypted audio data and the identifier of the encryption method, the data can be decrypted by using the same algorithm as that used in encryption.

When performing a job such as scanning that is closed within a tenant, an encryption key uniquely generated from the tenant ID need only be used. However, this shall exclude the execution of processing by which, for example, the processing result of a task is finally transmitted as data outside a tenant by using an apparatus such as a FAX apparatus. For example, if a task that is going to acquire processing target data acquires data of another job in the same tenant by mistake, the task can decrypt the acquired wrong data because it belongs to the same tenant. Consequently, the task transmits the wrong data outside the tenant. That is, the technique that encrypts data to be used by, for example, scan processing and FAX processing by using the same encryption method as described above cannot solve this problem.

In Japanese Patent Laid-Open No. 8-316951, the identifier is bundled with data, so the data can always be decrypted by referring to the table. This makes it impossible to prevent data acquired by mistake from being transmitted as wrong data outside a tenant.

SUMMARY OF THE INVENTION

The present invention provides a system having improved security.

According to one aspect of the present invention, there is provided a job processing system for processing a job including one or a plurality of tasks, the job processing system comprises: a service server which receives designation of a job; a job management service server which manages a job generated by receiving the designation; and one or a plurality of task processing service servers which process one or a plurality of tasks forming the job, in order to execute processing based on the job, the job management service server comprises: holding unit configured to hold, for each of the service servers, encryption information defining a method of encrypting and to decrypt a file corresponding to the job, and information which is used when generating a key for use in encryption and decryption; and specification unit configured to specify, when receiving encryption information acquisition request from the task processing service server, encryption information for a service server of a job corresponding to an encrypted file to be decrypted by the task processing service server, and the task processing service server comprises decryption unit configured to decrypt the encrypted file by using a method and information defined in the encryption information specified by the specification unit.

According to another aspect of the present invention, there is provided a job processing method of a job processing system for processing a job including one or a plurality of tasks, wherein the job processing system comprises: a service server which receives designation of a job; a job management service server which manages a job generated by receiving the designation; and one or a plurality of task processing service servers which process one or a plurality of tasks forming the job, in order to execute processing based on the job, in the job management service server, the method comprises: holding, for each of the service servers, encryption information defining a method of encrypting and decrypting a file corresponding to the job, and information which is used when generating a key for use in encryption and decryption; and specifying, when receiving encryption information acquisition request from the task processing service server, encryption information for a service server of a job corresponding to an encrypted file to be decrypted by the task processing service server, and in the task processing service server, the method comprises decrypting the encrypted file by using a method and information defined in the encryption information specified in the specifying step.

According to another aspect of the present invention, there is provided a non-transitory computer-readable medium storing a program for a job processing system comprising a service server which receives designation of a job, a job management service server which manages a job generated by receiving the designation, and one or a plurality of task processing service servers which process one or a plurality of tasks forming the job, in order to execute processing based on the job, the program causing the job management service server to function as: holding unit configured to hold, for each of the service servers, encryption information defining a method of encrypting and to decrypt a file corresponding to the job, and information which is used when generating a key for use in encryption and decryption; and specification unit configured to specify, when receiving encryption information acquisition request from the task processing service server, encryption information for a service server of a job corresponding to an encrypted file to be decrypted by the task processing service server, and causing the task processing service server to function as decryption unit configured to decrypt the encrypted file by using a method and information defined in the encryption information specified by the specification unit.

The present invention can provide a system having improved security.

Further features of the present invention will become apparent from the following description of exemplary embodiments (with reference to the attached drawings).

BRIEF DESCRIPTION OF THE DRAWINGS

FIG. 9 is a view showing examples of ticket information held by the scan service server group;

FIG. 11 is a view showing the system configuration of a task service server group;

FIGS. 12A and 12B are sequence diagrams showing a series of processes of scan processing;

FIGS. 13A and 13B are sequence diagrams showing a series of processes of processing of the FAX service server group;

FIG. 16 is a view showing examples of route information held by the route management service server group;

FIG. 17 is a view showing examples of task information held by the route management service server group;

FIGS. 20A and 20B are views showing examples of job information and encryption method information held by the job management service server group;

FIGS. 23A and 23B are views showing examples of file server information and file path information held by the central management server;

FIGS. 25A, 25B, and 25C are flowcharts showing the procedure of a job retry process caused by a data decryption failure according to the second embodiment.

DESCRIPTION OF THE EMBODIMENTS

<First Embodiment>

An embodiment for carrying out the present invention will be explained below with reference to the accompanying drawings.

[System Configuration]

Figure 1:
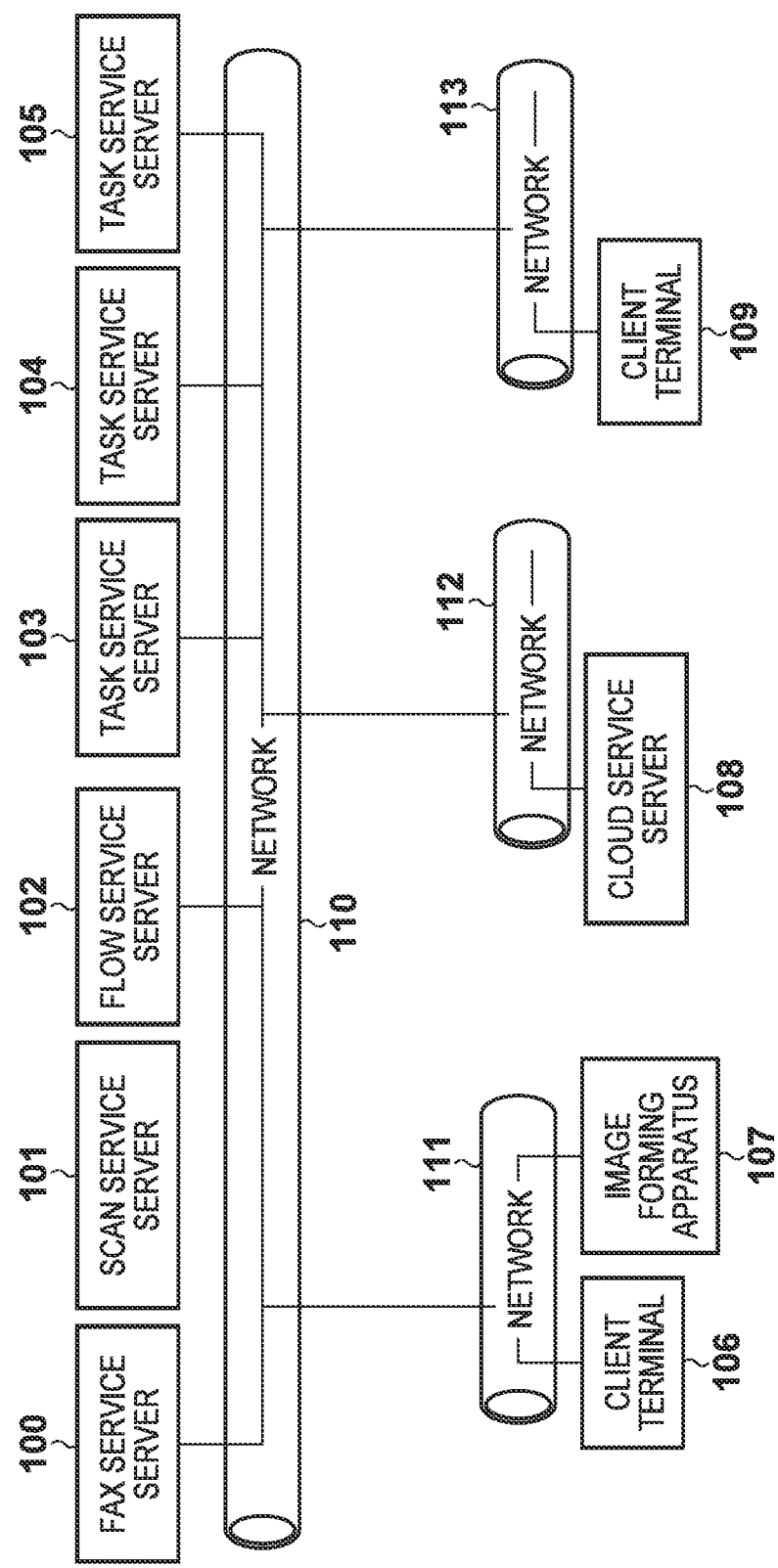
FIG. 1 is a view showing the overall arrangement of a cloud system.

FIG. 1 is a view showing the overall arrangement of an information processing system as a cloud system according to the embodiment of the present invention. Referring to FIG. 1, servers forming the information processing system of this embodiment include a FAX service server 100, scan service server 101, flow service server 102, and task service servers 103 to 105. Note that the FAX service server 100 and scan service server 101 are examples of a service server that receives job designation. This cloud system further includes client terminals 106 and 109, an image forming apparatus 107, and a cloud service server 108. These apparatuses are connected across networks 110 to 113. In FIG. 1, it is assumed that a plurality of apparatuses are connected across the networks as the task service servers 103 to 105, client terminals 106 and 109, image forming apparatus 107, and cloud service server 108. Each server shown in FIG. 1 can physically include a plurality of apparatuses, and can also be constituted as servers sharing processing.

Each of the networks 110 to 113 is a so-called communication network such as a LAN or WAN of the Internet, a telephone line, a dedicated digital line, an ATM, a frame relay line, a cable television line, and a data broadcasting wireless channel. Note that the networks 110 to 113 can also be implemented by combining these communication networks, and need only be capable of transmitting/receiving data. In a general cloud service, the networks 110 and 112 are the Internet, and the networks 111 and 113 are office networks or service provider networks.

The FAX service server 100, scan service server 101, flow service server 102, task service servers 103 to 105 are generally executed on server computers, and these servers provide the cloud service to users. Also, various enterprises and the like similarly disclose the cloud service servers 108 on the Internet, and these cloud service servers are generally executed on server computers. As described above, functions to be provided by one server can also be implemented by a plurality of servers. In this specification, each server will also be referred to as a "service" hereinafter.

Each of the client terminals 106 and 109 is, for example, a desktop personal computer, notebook personal computer, mobile personal computer, or PDA (Personal Data Assistant), and may also be a mobile phone incorporating a program execution environment. The client terminals 106 and 109 each incorporate an environment for executing a program such as a web browser (an Internet browser, a WWW browser, or a browser for using the World Wide Web).

Note that a system including the apparatuses from the FAX service server 100 to the network 113 shown in FIG. 1 is defined as the information processing system. Also, a system obtained by excluding the client terminal 106, image forming apparatus 107, and network 111 from the information processing system is defined as a job processing system.

The problem and object will be described in more detail below. Assume that a job includes one or more tasks, and a job management service controls job information, the job execution order, and the like. Each task can raise a plurality of instances. Also, each instance asynchronously acquires a job from the job management service, and performs, for example, image processing such as black dot removal, or a process of storing data in a shared folder. A temporary file management service manages data to be processed by each task.

Each task acquires data to be processed from a temporary file management service server as needed, and saves the processing result. Applications of two or more different services input jobs to the job management service. In this specification, an application that inputs a job to the job management service will be called a "service application". Assume that in a system that asynchronously processes jobs, each task as described above encrypts data when a job is input, and performs decryption/encryption as needed at the time of task processing. In the cloud service, each user is sometimes managed by the concept "tenant". For example, a company using the cloud service is constituted by tenant 1, and tenant ID 1 is assigned to tenant 1. In this case, it is necessary to prevent information of another tenant from being used by mistake. That is, a binary data encryption key must not be shared by different tenants.

On the other hand, if a task becomes unable to decrypt data to be used due to some trouble or the like, it is necessary to readily decrypt the data by referring to an application log of the temporary file management service, thereby securing a data restoration unit. Therefore, an encryption key is desirably not shared by a plurality of tenants but shared by as many jobs as possible, and hence can be a key uniquely generated from the tenant ID. When using only a key generated from the tenant ID, however, data of the same tenant may be processed by mistake. Accordingly, one object of this application is to further prevent this possibility.

[Hardware Configuration]

Figure 2:
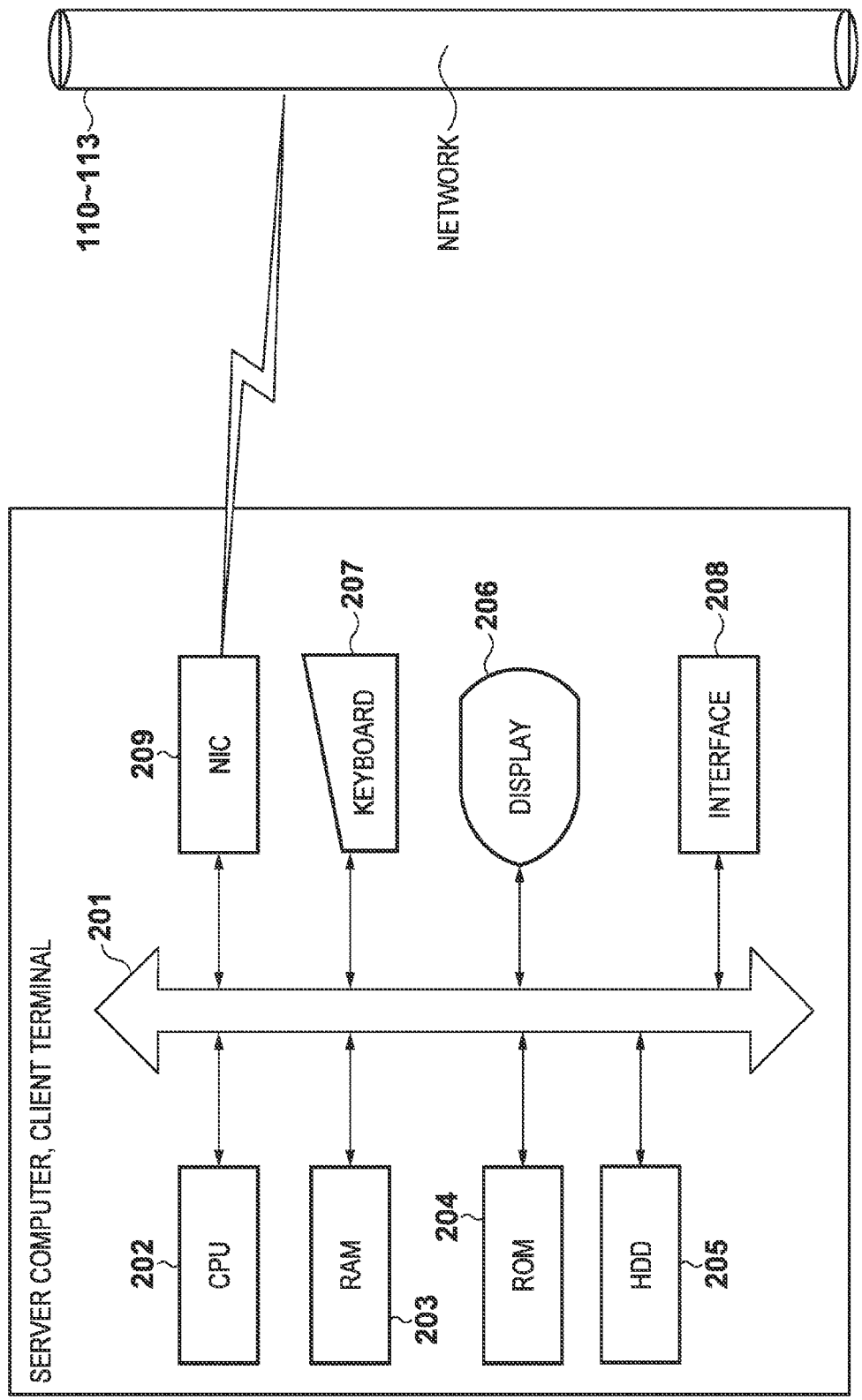
FIG. 2 is a view showing the hardware configurations of a client terminal and server computer.

FIG. 2 is a view showing the hardware configuration of the client terminals 106 and 109 and various service server computers (information processing apparatuses) according to the embodiment of the present invention.

Referring to FIG. 2, a CPU (Central Processing Unit) 202 controls the whole apparatus. The CPU 202 performs control to execute application programs, an OS, and the like stored in a hard disk (HDD) 205, and temporarily store information, files, and the like necessary to execute the programs in a RAM (Random Access Memory) 203. A ROM (Read Only Memory) 204 is a storage unit, and stores various data such as a basic I/O program. The RAM 203 is a temporary storage unit, and functions as a main memory, work area, and the like of the CPU 202. The HDD 205 is one of external storage unit, and functions as a large-capacity memory. The HDD 205 stores, for example, application programs such as a web browser, programs of the services, the OS, and related programs.

A display 206 is a display unit, and displays commands and the like input from a keyboard 207. An interface 208 is an external device I/F, and connects a printer, USB device, and peripheral device. The keyboard 207 is an instruction input unit, and used to receive instructions from the user. A system bus 201 controls data flows in the apparatus. A NIC (Network Interface Card) 209 exchanges data with external devices via the interface 208 and networks 110 to 112. Note that the above computer configuration is an example, so the configuration is not limited to this configuration example shown in FIG. 2 and may also include other constituent elements. Note also that the storage destinations of data and programs can be changed between the ROM 204, RAM 203, and HDD 205 in accordance with the features of the data and programs.

Figure 3:
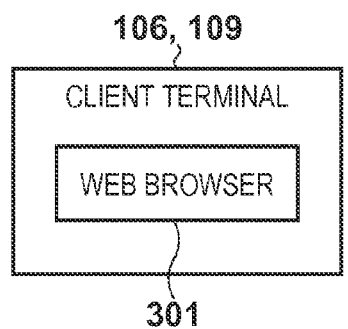
FIG. 3 is a view showing the system configuration of the client terminal.

FIG. 3 is a view showing the system configuration of the client terminals 106 and 109 according to the embodiment of the present invention. Referring to FIG. 3, the client terminal transmits requests to web applications provided by the FAX service server 100 and scan service server 101, displays responses, and the like by using a web browser 301. A user using the cloud service uses it via the client terminal 106 or 109 and the web browser 301.

Figure 4:
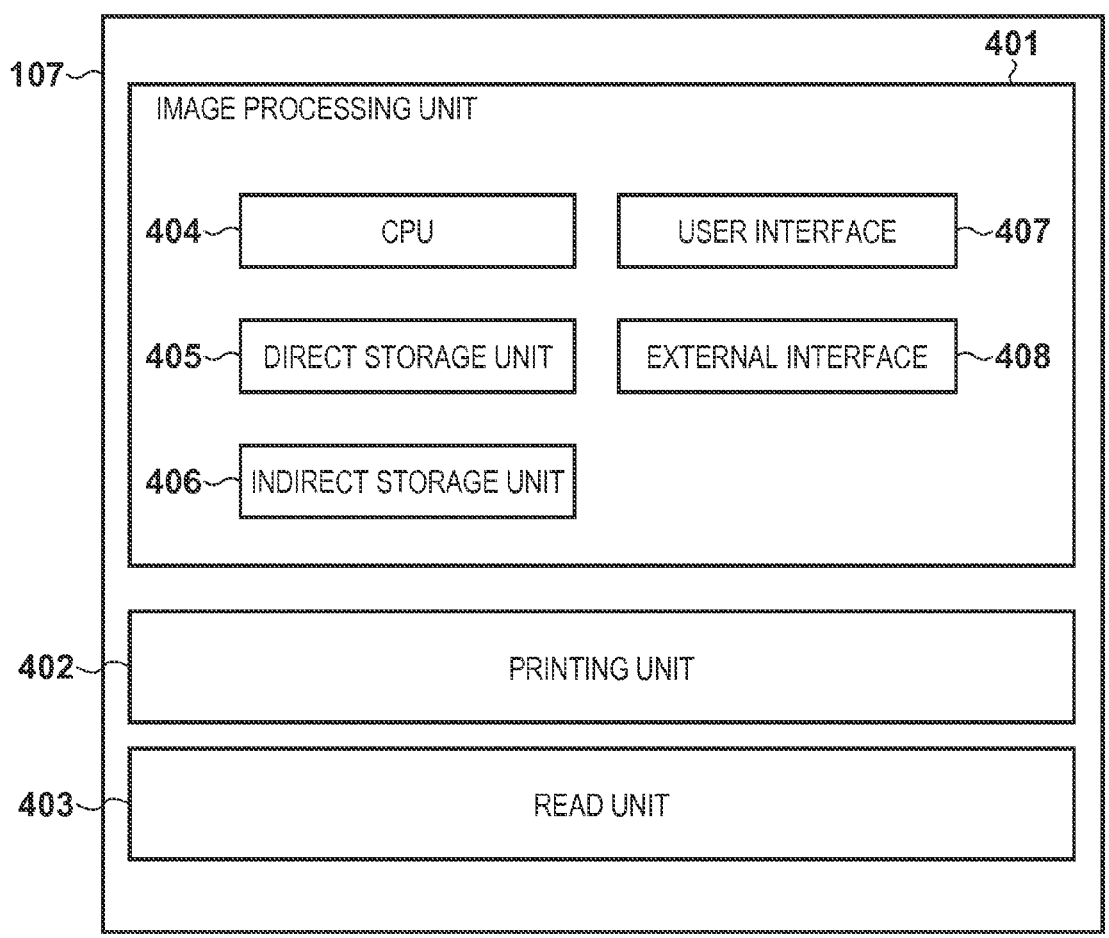
FIG. 4 is a view showing details of the internal arrangement of an image forming apparatus.

FIG. 4 is a block diagram showing the internal arrangement of the image forming apparatus 107 according to the embodiment of the present invention. In this embodiment, an apparatus having both a scanning function and printing function will be taken as an example. Note that when implementing a scan service provided by the scan service server, a scanning apparatus having no printing function may also be used.

Referring to FIG. 4, the image forming apparatus 107 includes an image processing unit 401, printing unit 402, and read unit 403. The image processing unit 401 includes a CPU 404, direct storage unit 405, indirect storage unit 406, user interface 407, and external interface 408.

The CPU 404 is a unit that executes a predetermined program, and designates various kinds of control of the image forming apparatus 107. The CPU 404 may also be a multiprocessor. The direct storage unit 405 is a work memory to be used when the CPU 404 executes a program, and is implemented by a RAM (Random Access Memory) or the like. A program to be executed by the CPU 404 is loaded into the direction storage unit 405. The indirect storage unit 406 stores various programs including application programs and a platform program, and is implemented by an SSD (Solid State Drive) or HDD. The various programs stored in the indirect storage unit 406 are moved to the direct storage unit 405 when the CPU 404 executes the programs.

The platform will be explained below. The platform allows a user to execute a new application developed by the user on the image forming apparatus 107, and customize the operation screen of the image forming apparatus 107. The CPU 404 moves the platform program stored in the indirect storage unit 406 to the direct storage unit 405. When the movement is complete, the CPU 404 can execute the platform program (for example, Java®). In this specification, the execution of the platform program by the CPU 404 will be referred to as "the platform is activated". Note that the platform operates on firmware (not shown) of the image forming apparatus 107. The platform program provides an environment for executing an object-oriented application program.

A method of executing an application program on the platform will be explained below. In this embodiment, scan software for transmitting a scanned image to the cloud service is running on the platform. The scan software receives a list of scan tickets from the scan service server 101 connected across a network by using a communication protocol such as HTTP (Hyper Text Transfer Protocol). The scan tickets will be described later together with the processing sequence.

Information such as settings for scanning and a process sequence after that is recorded on the scan ticket. In this specification, a module implemented by the operation of the scan software will be called a "scan software module" hereinafter. The user can complete scanning by selecting a scan ticket from the scan ticket list displayed by the scan software module, and scanning an original. The scan software module transmits the information of the scan ticket selected by the user and the scanned image data to the scan service server 101. Thus, the image forming apparatus 107 can be controlled by executing an application program on the platform.

A method of executing an application program will be explained. The activated platform moves an application program stored in the indirect storage unit 406 to the direct storage unit 405. When this movement is complete, the platform is capable of executing the application program. Then, the platform executes the application program. In this specification, a platform function that can be provided by thus executing an application program will be called a "platform application". The platform can further perform a part of each processing of flowcharts described in this specification.

The user interface 407 is used to receive a processing request from the user. For example, the user interface 407 receives a signal corresponding to an instruction input by the user via a keyboard, mouse, or the like. The external interface 408 can receive data from an external device and transmit data to the external device. For example, the external device includes an external memory such as an external HDD or external USB memory, or another apparatus such as another host computer or image forming apparatus connected across a network. The image forming apparatus 107 can communicate with the client terminal 106 and scan service server 101 across the networks 110 and 111.

[Processing Sequences in Scan Service and FAX Service]

Next, the individual service servers providing the cloud service, that is, the FAX service server 100, scan service server 101, and task service servers 103 to 105 will be explained. In addition to the explanation of each service server, the procedure of scan processing will be explained with reference to a scan processing sequence diagram shown in FIGS. 12A and 12B. Furthermore, the procedure of FAX processing will be explained with reference to a FAX service sequence diagram shown in FIGS. 13A and 13B.

(Generation of Scan Ticket and Input of Scan Job)

First, the procedure from the generation of a scan ticket to the input of a scan job as the scan processing will be explained below. The scan service server 101 will be explained with reference to FIG. 5. The scan service server 101 is a service that provides a scanning function in the cloud service.

Figure 5:
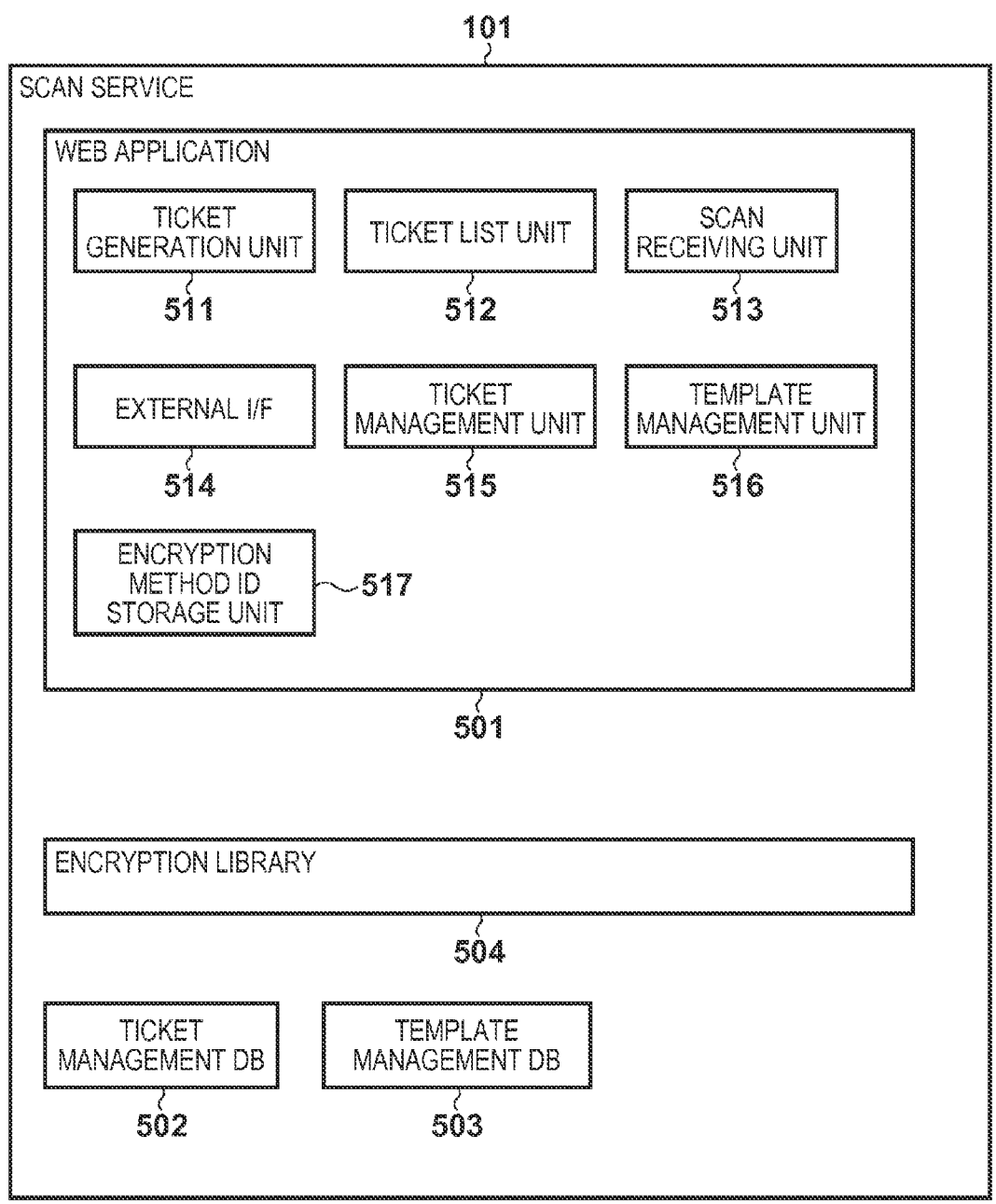
FIG. 5 is a view showing the system configuration of a scan service server group.

FIG. 5 is a view showing the system configuration of the scan service server 101 according to this embodiment. The scan service server 101 includes a web application unit 501, ticket management DB 502, template management DB 503, and encryption library 504.

Figure 7:
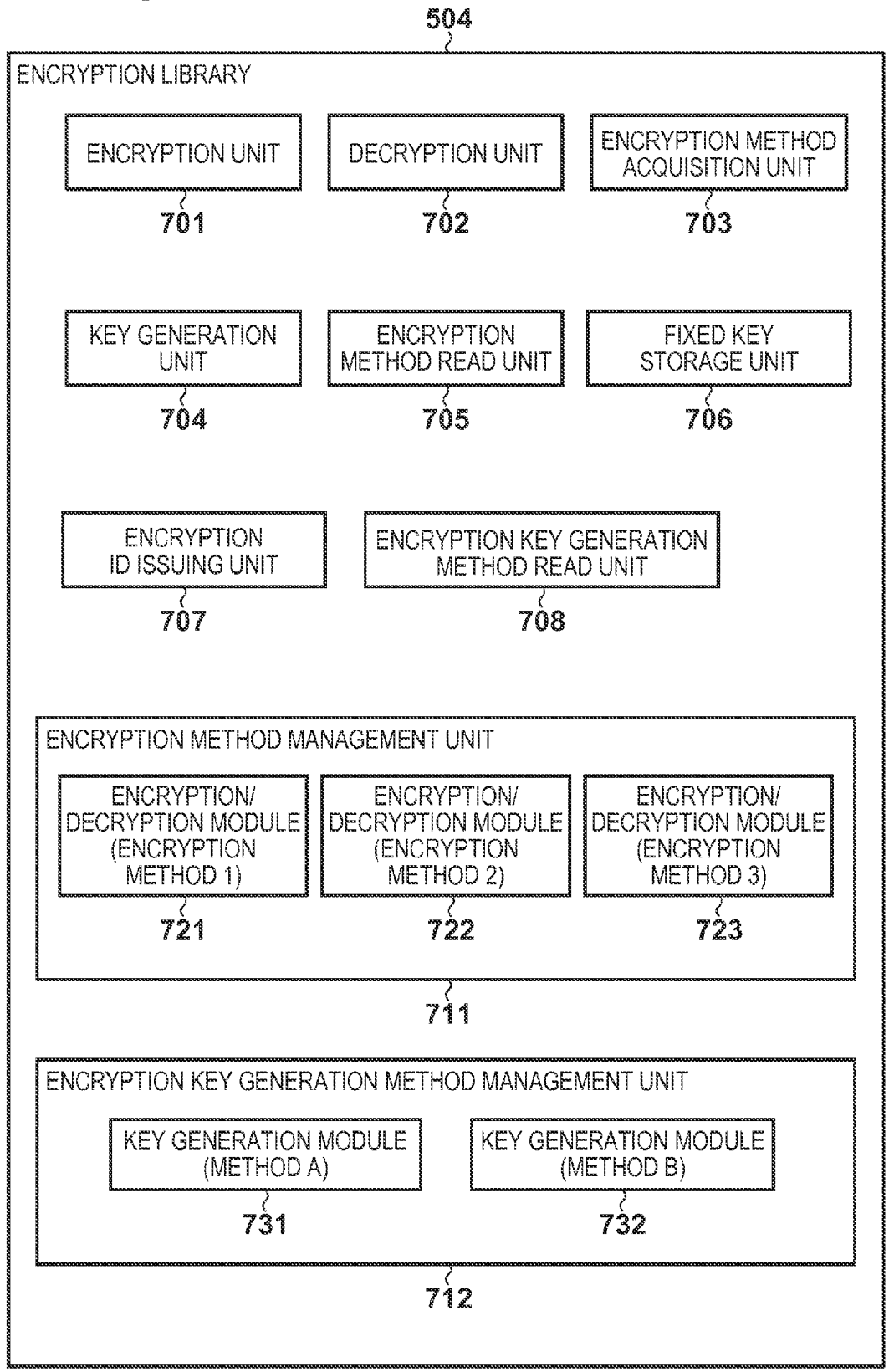
FIG. 7 is a view showing the system configuration of an encryption library.

The encryption library 504 is a library to be used to encrypt and decrypt data. FIG. 7 is a view showing the system configuration of the encryption library 504. An encryption method management unit 711 manages encryption/decryption modules 721 to 723. The encryption/decryption modules 721 to 723 correspond to different encryption methods.

An encryption key generation method management unit 712 manages key generation modules 731 and 732. An encryption unit 701 and decryption unit 702 read one of the encryption/decryption modules 721 to 723 from the encryption method management unit 711 via an encryption method read unit 705, and respectively perform encryption and decryption of the data. Since the plurality of encryption/ decryption modules 721 to 723 can be read as described above, it is possible to adopt different encryption methods in accordance with service applications (that is, the contents of jobs).

A key generation unit 704 reads one of the key generation modules 731 and 732 from the encryption key generation method management unit 712 via an encryption key generation method read unit 708, and generates an encryption key necessary for encryption and decryption. Since the plurality of key generation modules can be read, it is possible to adopt methods of generating different encryption keys and combinations of information (elements) required to generate the different encryption keys in accordance with service applications. This makes it possible to select whether to make an encryption key unique to the tenant ID or a job. A fixed key storage unit 706 stores a fixed key to be used when the key generation unit 704 generates an encryption key. An encryption ID issuing unit 707 issues an encryption ID unique to a job.

Figure 8:
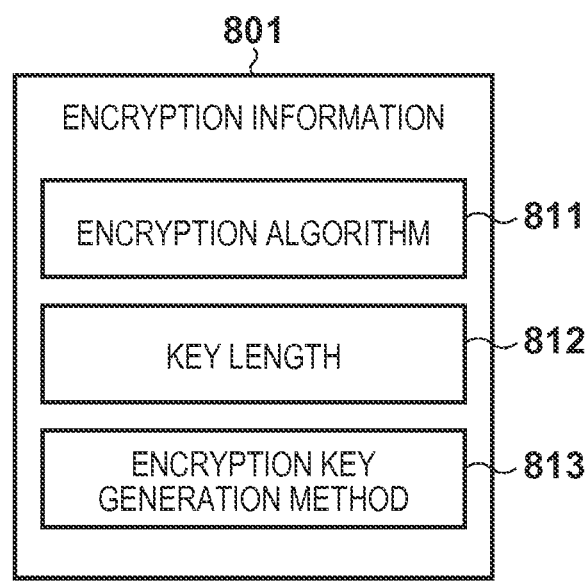
FIG. 8 is a view showing the constituent elements of encryption information.

An encryption method acquisition unit 703 has a function of transmitting an encryption method ID (to be described later) to the flow service server 102, and acquiring corresponding encryption information 801. FIG. 8 is a view showing the constituent elements of the encryption information 801. The encryption information 801 includes an encryption algorithm 811, key length 812, and encryption key generation method 813. As the encryption algorithm 811, AES (Advanced Encryption Standard), DES (Data Encryption Standard), or the like is used. The key length 812 is set to, for example, 64, 128, or 256 (bits). In the encryption key generation method 813, information of a method of combining a tenant ID, fixed key, and encryption ID and information of a method of generation an encryption key from the combination are set.

As will be described in detail later, service applications for performing encryption and decryption and the task service servers 103 to 105 share the encryption library 504. Accordingly, fixed keys stored in the fixed key storage unit 706 are common to service applications and the task service servers 103 to 105 using the encryption library 504.

In this embodiment, the web application unit 501 provides a scanning function. A ticket generation unit 511 provides a series of functions for the user to generate a scan ticket. In the scan ticket, settings for scanning an original by the image forming apparatus 107, the definitions of procedures after that, parameters for tasks to be performed by the procedures, and the like are recorded.

Referring to FIGS. 12A and 12B, the ticket generation unit 511 receives a scan ticket generation screen request from the web browser 301 of the client terminal 106 (step S1201). Then, the ticket generation unit 511 generates a scan ticket generation screen, and returns it as a response (step S1202). In this step, the ticket generation unit 511 causes a template management unit 516 to acquire a scan ticket template registered in the template management DB 503, and display a template name contained in the template on the web browser 301 of the client terminal 106. Detailed contents of the template management DB 503 will be described later with reference to FIG. 10.

When the user inputs a scan ticket generation request by operating the web browser 301 of the client terminal 106 (step S1203), the ticket generation unit 511 generates a scan ticket, and requests a ticket management unit 515 to save the generated scan ticket. Upon receiving this ticket save request, the ticket management unit 515 saves ticket information in the ticket management DB 502. Details of the ticket management DB 502 will be explained later with reference to FIG. 9. After saving the ticket information, the ticket management unit 515 returns a response to the client terminal 106 (step S1204).

An external I/F 514 communicates with the scan software module running on the image forming apparatus 107. The scan software module accesses the function of a ticket list unit 512 or the function of a scan receiving unit 513 via the external I/F 514. Referring to FIG. 12A, the scan software module of the image forming apparatus 107 performs ticket list acquisition to the ticket list unit 512 via the external I/F 514 (step S1205). The ticket list unit 512 generates a list of scan tickets by using information managed by the ticket management unit 515, and returns a response to the scan software module (step S1206). The image forming apparatus 107 having received the response displays the acquired ticket list on the user interface 407 shown in FIG. 4.

In the scan processing shown in FIG. 12A (step S1207), the user selects one of the scan tickets displayed on the user interface 407, and sets a paper sheet in a built-in scanner of the image forming apparatus. After that, scanning is executed. The scan software module transmits the scanned image data and scan ticket to the scan receiving unit 513 via the external I/F 514 (step S1208).

The scan receiving unit 513 receives the transmitted scan ticket and image data, and acquires the encryption method ID of the image data from the encryption method ID storage unit 517. Note that this acquisition process implements the reception of job execution designation. The number of encryption method IDs storable in the encryption method ID storage unit 517 is 1. This indicates that one data encryption method corresponds to the scan service server 101. The scan receiving unit 513 transmits the encryption method ID to the flow service server 102 via the encryption method acquisition unit 703 of the encryption library 504 (step S1209). The flow service server 102 returns the encryption information 801 corresponding to the encryption method ID as a response (step S1210). Note that the flow service server 102 manages the encryption method ID and encryption information 801 by associating them with each other.

Then, the encryption ID issuing unit 707 issues an encryption ID (step S1211). Subsequently, the scan receiving unit 513 acquires a fixed key from the fixed key storage unit 706. The scan receiving unit 513 generates an encryption key by combining the fixed key and information linked to the job in accordance with the encryption key generation method 813 contained in the encryption information 801 acquired in step S1210 (step S1212). Details of this process will be described later. Note that the generation of this encryption key implements a first generation unit.

Then, to transmit an image data encryption request to the encryption unit 701, the scan receiving unit 513 transmits the image data, the encryption information 801 acquired in step S1210, and the encryption key generated in step S1212 to the encryption unit 701. The encryption unit 701 encrypts the image data by reading an encryption/decryption module corresponding to the encryption information 801 from the encryption method management unit 711 via the encryption method read unit 705 (step S1213). This implements a first encryption unit.

The scan receiving unit 513 inputs the encrypted image data to the flow service server 102 (step S1214). If the encrypted image data is correctly received, the flow service server 102 returns an ID (file group ID) uniquely representing the image data to the scan service server 101 (step S1215). After that, the scan receiving unit 513 transmits the file group ID, encryption method ID, scan ticket, tenant ID, and encryption ID as a job to the flow service server 102 (step S1216). That is, the job is generated when a service server such as the scan service server 101 receives job execution designation. The tenant ID is tenant information (ID: identifier) that represents a tenant to which the user having input the job (having designated the execution of the job) (the user having designated the scan processing in FIGS. 12A and 12B) belongs, and is unique to the tenant. Note that a job management service server 1402 (to be described later) manages these jobs.

The foregoing are the system configuration of the scan service server 101 and the procedure until the input of a scan job.

(Generation of FAX Ticket and Input of FAX Job)

Next, the procedure from the generation of a FAX ticket to the input of a FAX job as the FAX processing will be explained.

The FAX service server 100 will be explained with reference to FIG. 6. The FAX service server 100 is a service server for providing a FAX function in the cloud service. Note that FAX is generally capable of both transmission and reception, but this embodiment will describe only a transmission part of FAX.

Figure 6:
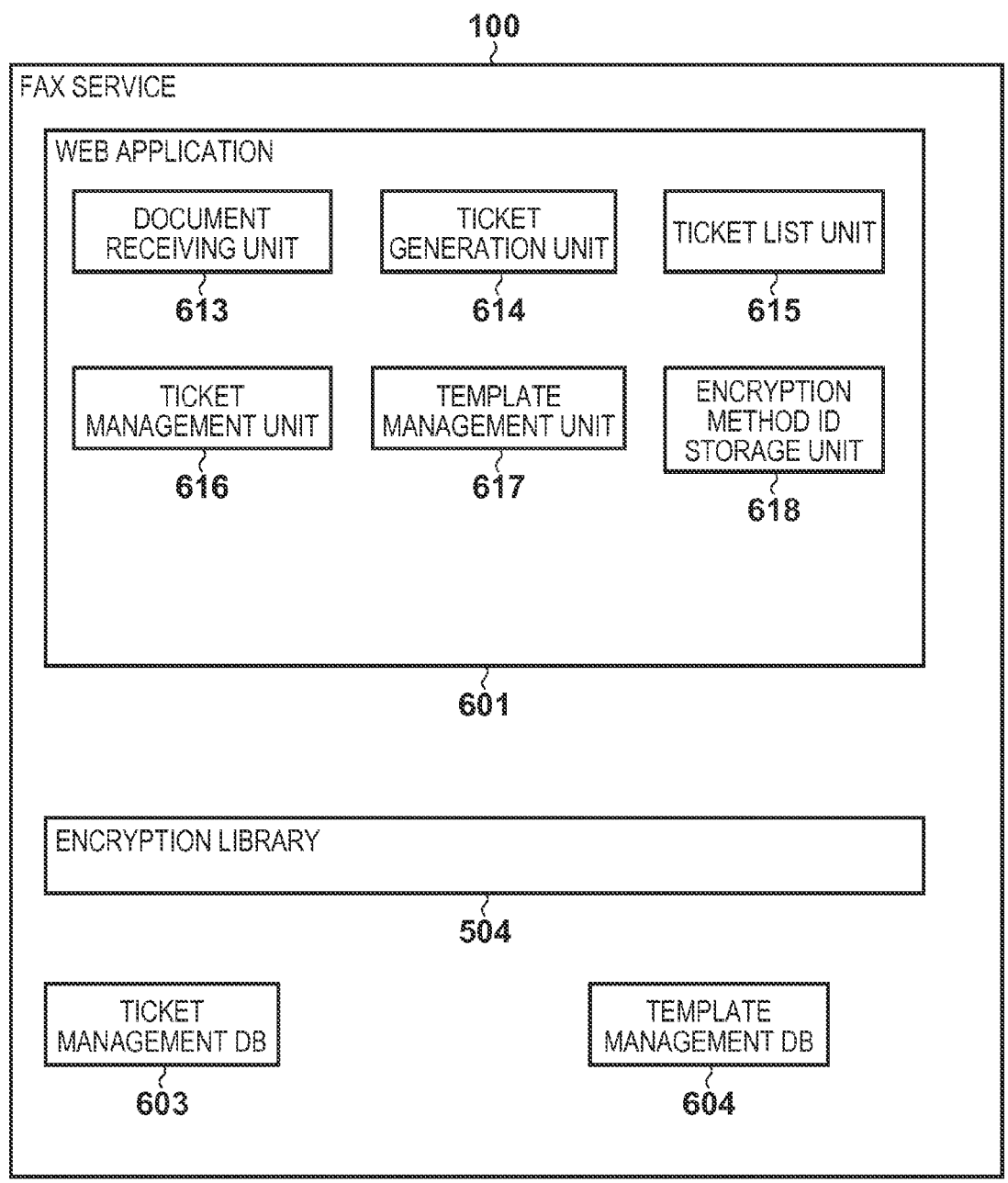
FIG. 6 is a view showing the system configuration of a FAX service server group.

FIG. 6 is a view showing the system configuration of the FAX service server 100 according to this embodiment. The FAX service server 100 includes a web application unit 601, the encryption library 504, a ticket management DB 603, and a template management DB 604. The encryption library 504 is the same as that in the arrangement (FIG. 7) of the scan service server 101.

The web application unit 601 provides an application program for providing the FAX function. A ticket generation unit 614 implements a series of functions for the user to generate a FAX ticket. The definition of procedures, address information of the FAX transmission destination, and the like are recorded in the FAX ticket.

Referring to FIG. 13A, the ticket generation unit 614 receives a FAX ticket generation screen request from the web browser 301 of the client terminal 109 (step S1301). The ticket generation unit 614 generates a FAX ticket generation screen, and returns the generated FAX ticket generation screen as a response to the request (step S1302). In this step, the ticket generation unit 614 acquires a FAX ticket template registered in the template management DB 604 from a template management unit 617, and displays a template name contained in the template on the web browser 301 of the client terminal 109. Detailed information of the template management DB 604 will be described later with reference to FIG. 10.

In accordance with an operation performed by the user via the web browser 301 of the client terminal 109, the client terminal 109 transmits a FAX ticket generation request (step S1303). When receiving the FAX ticket generation request, the FAX service server 100 generates a FAX ticket, and requests a ticket management unit 616 to save the generated FAX ticket. The ticket management unit 616 receives the ticket save request, and saves the ticket information in the ticket management DB 603. After saving the ticket information, the ticket management unit 616 returns a response to the FAX ticket generation request (step S1304). After that, the client terminal 109 transmits the FAX ticket and FAX transmission data to the FAX service server 100 in accordance with instructions from the user (step S1305).

A document receiving unit 613 receives the FAX ticket and FAX transmission data from the client terminal 109, and acquires the encryption method ID of the document from an encryption method ID storage unit 618. The number of encryption method IDs storable in the encryption method ID storage unit 618 is 1, which is the same as that in the scan service server 101. This indicates that the number of data encryption methods for the FAX service server 100 is 1. Note that the encryption method ID described in the encryption method ID storage unit 618 is not always the same as the encryption method ID described in the encryption method ID storage unit 517 of the scan service server 101. By thus changing the encryption method ID for each service application using the flow service server 102, data can be encrypted by an encryption method unique to each service application. Steps S1306 to S1313 in FIG. 13A indicate the procedures of the encryption of document data and the input of a job in the FAX processing, but an explanation of these steps will be omitted because they are the same as steps S1209 to S1216 in the scan processing.

[Data Configuration]

FIG. 9 shows an example of the information managed by the ticket management DB 502 of the scan service server 101 and the ticket management DB 603 of the FAX service server 100. A user ID 901 is an ID (identifier) uniquely representing the user having generated the ticket. A ticket ID 902 is an ID uniquely defining the ticket. A route ID 903 is an ID corresponding to a template selected on the ticket generation screen by the user. When the user selects a ticket and executes scanning, the scanned data is processed in the order of tasks defined in the route ID 903. Parameters 904 record the settings of scanning.

Figure 10:
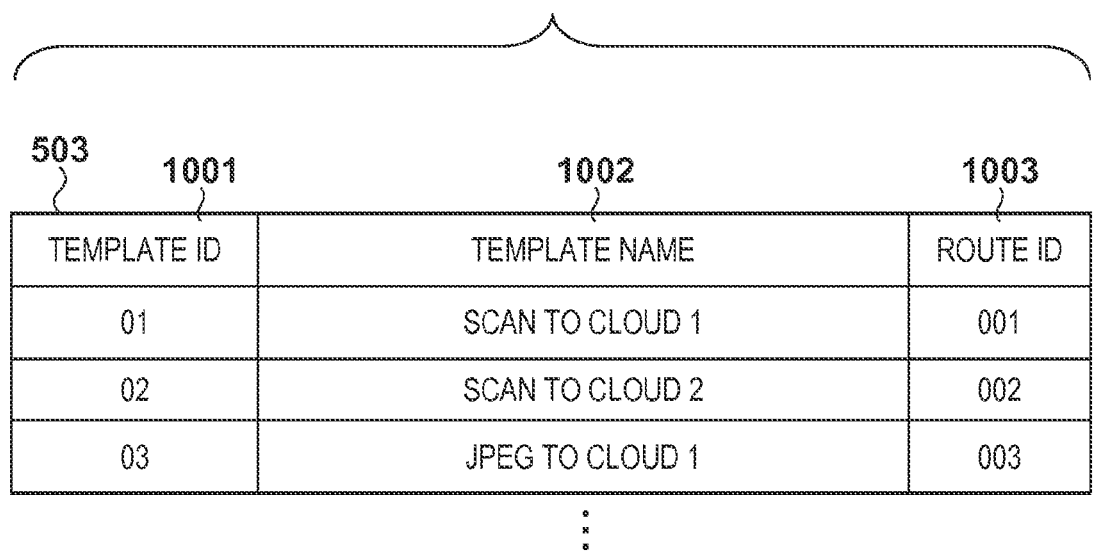
FIG. 10 is a view showing examples of template information held by the scan service server group.

FIG. 10 shows an example of the data configuration of a template managed by the template management DB 503 of the scan service server 101, and the template management DB 604 of the FAX service server 100. The template management DBs 503 and 604 are databases for associating route information managed by a route information management DB 1501 shown in FIG. 15 with a template displayed on the ticket generation screen. The template data contain template IDs 1001 and 1011, template names 1002 and 1012, and route IDs 1003 and 1013. Each of the template IDs 1001 and 1011 is an ID uniquely representing the template. Each of the template names 1002 and 1012 is a name to be displayed on the ticket generation screen. Each of the route IDs 1003 and 1013 represents an external key to a route ID 1601 shown in FIG. 16 managed by the route information management DB 1501.

[Processing in Task Service Server]

The system configuration of the task service servers 103 to 105 according to the embodiment of the present invention will be explained below with reference to FIG. 11. A task service is provided by a task processing service server (or servers) for providing elemental functions for implementing a scan service, FAX service, or the like. For example, a task service server for performing image processing on image data and a task service server for transmitting image data to another cloud service server 108 that provides a file sharing function exist. Note that processing based on a job is executed by one or a plurality of task processing service servers by processing one or a plurality of tasks forming the job.

In this embodiment, the task service server 103 performs OCR processing on image data, and embeds text data as the OCR result in the image data. The task service server 104 performs a process of saving image data by uploading it to a specific service server that provides a storage function of the cloud service server 108. The task service server 105 performs a process of transmitting document (or image) data to a FAX apparatus. Note that these processes of the task service servers are examples, so other processes may also be performed.

The individual constituent elements will be explained below with reference to the scan processing sequence diagram shown in FIGS. 12A and 12B and the FAX processing sequence diagram shown in FIGS. 13A and 13B. Referring to FIGS. 12A, 12B, 13A, and 13B, the task service server 103 is a task incorporated into the route of a job input from the scan service server 101 or FAX service server 100.

In steps S1217, S1229, S1314, and S1329, task acquisition units 1111 of the task service servers 103 to 105 periodically inquire of the flow service server 102, and acquire a task processable by the task service servers 103 to 105. For example, a processable task is acquired by using a current task ID managed by the flow service server 102. Based on job information acquired by the task acquisition units 1111, data acquisition units 1112 of the task service servers 103 to 105 acquire image data and document data to be processed from the flow service server 102 in steps S1219, S1231, S1316, and S1331 (steps S1220, S1232, S1317, and S1332).

Subsequently, the data acquisition units 1112 of the task service servers 103 to 105 decrypt the image/document data. First, the data acquisition units 1112 of the task service servers 103 to 105 transmit an encryption algorithm acquisition request to the flow service server 102 via the encryption method acquisition unit 703 of the encryption library 504 (steps S1221, S1233, S1318, and S1333). The data acquisition units 1112 transmits this encryption algorithm acquisition request together with an encryption method ID (to be described later) as one constituent element of a job to the flow service server 102. The flow service server 102 returns encryption information 801 corresponding to the encryption method ID (steps S1222, S1234, S1319, and S1334). That is, the job management service server 1402 of the flow service server 102 specifies encryption information for a service server of a job corresponding to the encrypted file to be decrypted by the task processing service server. Then, the job management service server 1402 returns the encryption information as a response in steps S1222, S1234, S1319, and S1334.

Subsequently, the data acquisition units 1112 of the task service servers 103 to 105 generate an encryption key having a length corresponding to the key length 812 of the encryption information 801 via key generation units (steps S1223, S1235, S1320, and S1335). This encryption key generation implements a second generation unit. The encryption key is generated by using information associated with a job managed by the fixed key storage unit 706 or a job information management DB 1802.

The data acquisition units 1112 of the task service servers 103 to 105 transmit an image/document data decryption request to the decryption units 702. In this step, the encryption information 801 acquired in steps S1222, S1234, S1319, and S1334 and the encryption key generated in steps S1223, S1235, S1320, and S1335 are transmitted together with the image/document data. The decryption units 702 of the task service servers 103 to 105 perform decryption by reading an encryption/decryption module corresponding to the encryption information 801 from the encryption method management units 711 via the encryption method read units 705 (steps S1224, S1236, S1321, and S1336). In this process, the data acquired in steps S1220, S1232, S1317, and S1332 is decrypted in accordance with the encryption information specified by the job management service server. That is, the decryption unit 702 of the task service server decrypts the encrypted file by using the method and information defined in the encryption information.

Task processing units 1115 of the task service servers 103 to 105 perform various kinds of processing on the acquired decrypted data (steps S1225, S1237, S1322, and S1337).

Then, the task processing unit 1115 of the task service server 103 encrypts the processing results (processed data) obtained in steps S1225 and S1337. The task processing unit 1115 of the task service server 103 transmits, to the encryption unit 701, the encryption information 801 acquired in steps S1222 and S1219 and the encryption key acquired in steps S1223 and S1335 together with the processing results. The encryption unit 701 performs encryption by reading an encryption/decryption module corresponding to the encryption information 801 from the encryption method management unit 711 via the encryption method read unit 705 (steps S1226 and S1324). This implements a second encryption unit. In addition, a data saving unit 1113 causes the flow service server 102 to save the data encrypted in steps S1226 and S1324 (steps S1227 and S1325).

The task processing unit 1115 of the task service server 104 transmits data as the processing result in step S1237 to the cloud service server 108 (step S1238). The task processing unit 1115 of the task service server 105 transmits the image/document data to a FAX terminal (step S1338). Task status notification units 1114 of the task service servers 103 to 105 notify the flow service server 102 of the results of the series of task processing (steps S1228, S1239, S1326, and S1339). Note that if a failure occurs during the task processing, the flow service server 102 is notified of this failure.

[Flow Service Server]

The flow service server 102 will be explained in detail below. The flow service server 102 is a service server for performing route management, job management, and temporary file management.

Figure 14:
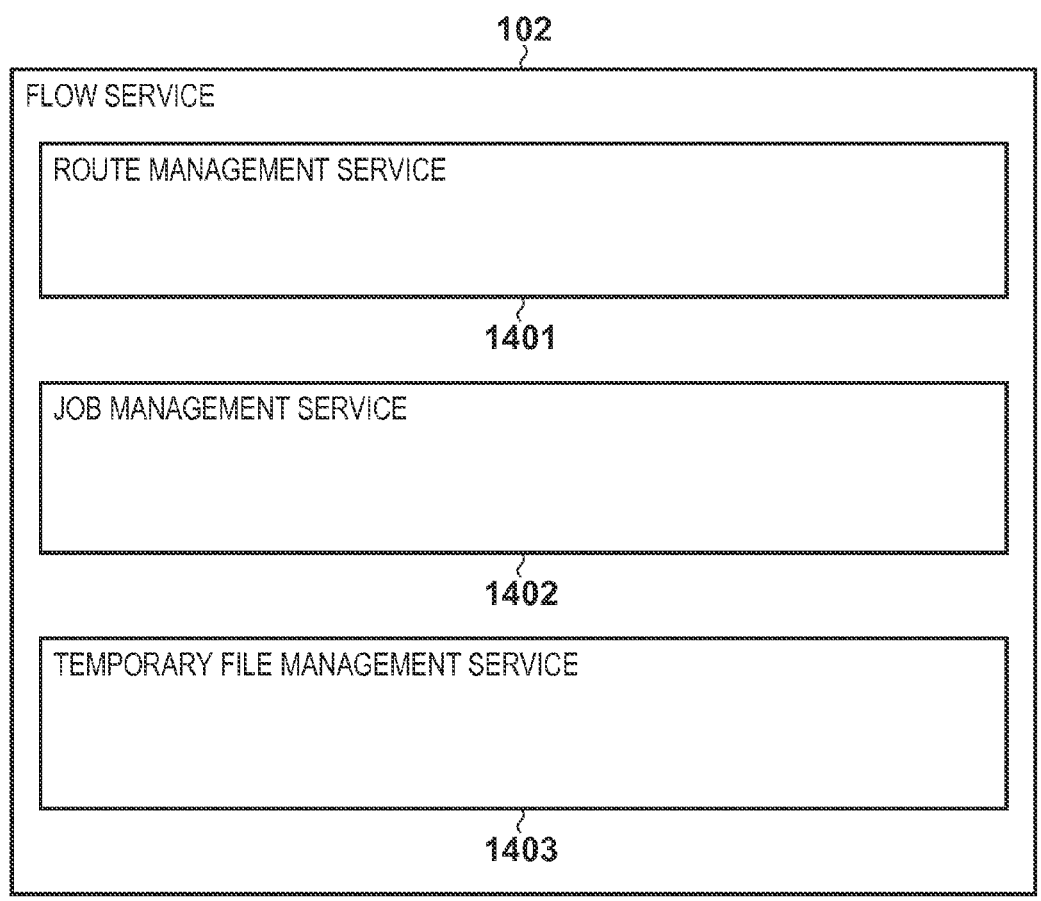
FIG. 14 is a view showing the system configuration of a flow service server group.

FIG. 14 shows an outline of the system configuration of the flow service server 102. The flow service server 102 includes a route management service server 1401, job management service server 1402, and temporary file management service server 1403. Services are provided by executing various processes on these servers, and the service of the flow service server 102 is provided for the user when these servers cooperate with each other. Note that the job management service server 1402 manages a job for each tenant to which the user having designated the job belongs.

The route management service server 1401 manages information of a route connecting tasks. As described previously, one job includes one or a plurality of tasks, and the job is processed by processing the series of tasks. The job management service server 1402 manages the job processing based on the route information. The temporary file management service server 1403 manages data when a job is input and manages the saving of processing result data of each task.

[Route Management Service Server]

Figure 15:
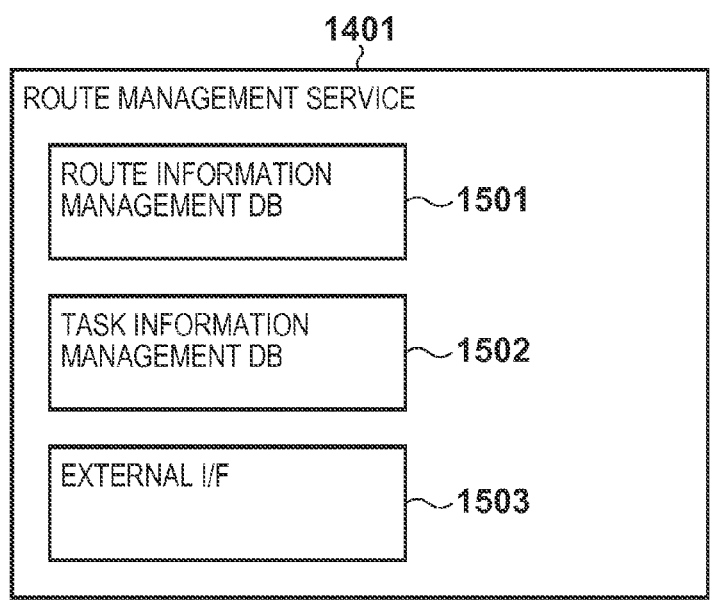
FIG. 15 is a view showing the system configuration of a route management service server group.

FIG. 15 shows the system configuration of the route management service server 1401. The route management service server 1401 includes a route information management DB 1501, task information management DB 1502, and external I/F 1503.

The route information management DB 1501 holds information for defining the connection between tasks by a unit called route. The task information management DB 1502 defines each processing by a unit called task, and holds information of the task. The external I/F 1503 is an I/F to be used to inquire of the route management service server 1401, or refer to the route information management DB 1501 or task information management DB 1502 from the job management service server 1402 or the like.

FIG. 16 shows examples of information managed by the route information management DB 1501. A route ID 1601 is an ID for uniquely identifying a route. A sequence number 1602 holds the ordinal number of the execution of a task in the route. A task ID 1603 indicates a task to be executed. For example, in data 1606, 1607, and 1608, the route ID defines a route "002". In the route "002", the data 1606 is a task to be executed first, and a task having a task ID "Task1" is executed. Similarly, the data 1607 is a task to be executed second, and a task "Task3" is executed. The data 1608 is a task to be executed third, and a task "Task5" is executed.

FIG. 17 shows examples of information managed by the task information management DB 1502. A task ID 1701 is an ID for uniquely identifying a task. A task name 1702 is the name of the task. A retry count upper limit 1703 is the upper limit of the count of retries performed when each task has failed. Each task is terminated when task processing is successful. However, if the processing has not been executed to the end for some cause such as a file acquisition failure or communication error, the task is retried based on the retry count upper limit 1703.

[Job Management Service Server]

Figure 18:
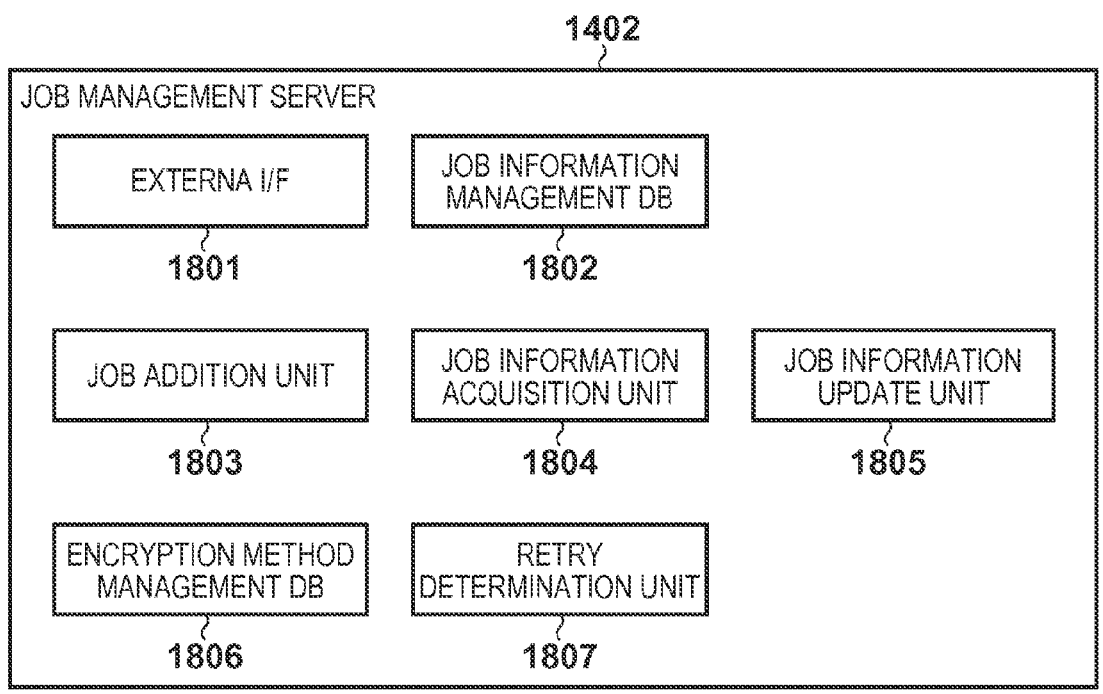
FIG. 18 is a view showing the system configuration of a job management service server group.

The job management service server 1402 will be explained below with reference to FIG. 18. The job management service server 1402 is a service server for exchanging task information in response to requests from the task service servers 103 to 105, and managing the state of each task.

An external I/F 1801 is an I/F to be used to communicate with the task service servers 103 to 105, FAX service server 100, and scan service server 101. A job information management DB 1802 manages the status of each formed job, and manages the ID of data to be processed by each job. The job information management DB 1802 will be described later with reference to FIG. 20A. A job addition unit 1803 stores job information in the job information management DB 1802 when receiving job input requests from the scan service server 101 and FAX service server 100 (steps S1216 and S1313 in FIGS. 12 and 13). The job information includes columns (2001 to 2013) existing in the job information management DB 1802 shown in FIG. 20A.

A job information acquisition unit 1804 receives task acquisition requests from the task service servers 103 to 105 (steps S1217, S1229, S1314, and S1329), and acquires job information from the job information management DB 1802. The acquired job information is transferred as responses to the requests to the task service servers 103 to 105 in task acquisition processes (steps S1218, S1230, S1315, and S1330). In result notification (steps S1228, S1239, S1326, and S1339), a job information update unit 1805 receives job information update requests from the task service servers 103 to 105, and updates information of the jobs in the job information management DB 1802. Examples of the information to be updated are a current task ID 2004, status 2005, and last update time 2006.

Before updating the current task ID 2004, the job information acquisition unit 1804 acquires a next task ID in the route ID from the route information management DB 1501. The job information update unit 1805 updates the current task ID 2004 based on the acquired task ID. Also, the job information update unit 1805 updates the status 2005 to "0", and the last update time 2006 to the present time. An encryption method management DB 1806 manages the ID and key length of an image/document data encryption method. The encryption method management DB 1806 will be described later with reference to FIG. 20B.

(Job Information Management DB)

The data held in the job information management DB 1802 will be explained with reference to FIG. 20A. A job ID 2001 is an ID uniquely assigned to each job information. A route ID 2002 stores a route ID indicating a route between tasks forming each job. A file group ID 2003 is an ID issued from the temporary file management service server 1403. A current task ID 2004 is a task ID indicating a task as a current processing target in the job. Each of the task service servers 103 to 105 confirms the current task ID 2004, and selectively processes a row equal to the task ID assigned to the task service. When the processing of the task is complete, the job information update unit 1805 updates the current task ID to the task ID of the next task in the route ID. Based on the updated information, the next task in the route is processed.

In the status 2005, values representing waiting (0), executing (1), error (2), and normal termination (−1) are set. When selecting a job, each of the task service servers 103 to 105 selects a row in which the status is waiting (0). This makes it possible to prevent an event in which a plurality of task services process the same task. After selecting a job, each of the task service servers 103 to 105 changes the status 2005 to (1) via the job information update unit 1805.

The last update time 2006 is updated when each of the task service servers 103 to 105 executes given processing on the job. Given processing herein mentioned is a status update process or job acquisition process. When each of the task service servers 103 to 105 acquires a job, if a plurality of pieces of job information equal to its own task ID exist, the task service server selects a job having the oldest last update time 2006. Consequently, processes for jobs are advanced so as not to leave processing undone for any job.

In parameters 2007, job setting information, setting information to be transferred to another task service server, and the like are described. An encryption method ID 2008 stores an encryption method ID 2021 managed by the encryption method management DB 1806. As will be described later, jobs having different encryption method IDs 2008 are encrypted by different encryption methods. Also, when decrypting or encrypting data, the task service servers 103 to 105 acquire information of a corresponding encryption method and key length from the encryption method management DB 1806 by using the encryption method ID 2008.

A job retry count upper limit 2009 represents the upper limit of the retry count of a job. A job retry count 2010 represents the current retry count of a job. A current task retry count 2011 represents the retry count of a task as a present processing target represented by the current task ID 2004. When a task and job are unsuccessful, a retry determination unit 1807 controls a retry by using the job retry count upper limit 2009, job retry count 2010, current task retry count 2011, and task retry count upper limit 1703. A retry determination process for a task and job will be described later with reference to FIG. 19.

A tenant ID 2012 represents the tenant ID of a tenant to which the user having input a job represented by the job ID 2001 belongs. An encryption ID 2013 is an ID unique to a job, which is used when generating an encryption key necessary for encryption and decryption.

In this embodiment, the encryption ID 2013 is used as information unique to a job when generating an encryption key. However, it is possible to use any information unique to a job, such as the job ID 2001 or file group ID 2003.

(Encryption Method Management DB)

The data (encryption information) managed by the encryption method management DB 1806 will be explained with reference to FIG. 20B. An encryption method ID 2021 is an ID uniquely assigned to each encryption information. An encryption method 2022 stores an encryption algorithm (or alternative symbol) such as AES or DES. The differences between the encryption methods correspond to the differences between the encryption/decryption modules 721, 722, and 723 of the encryption method management unit 711. Also, since each service server holds one encryption method ID, the encryption method ID corresponds to the service server. Accordingly, the job management service server holds the encryption information for each service server.

A key length 2023 stores a key length bit by bit, which is used when performing encryption by using the encryption method 2022. The encryption method ID 2021 managed by the encryption method management DB 1806 is stored in the encryption method storage units S17 and 618 shown in FIGS. 5 and 6. The scan service server 101 and FAX service server 100 can encrypt image/document data by using different encryption methods, because different encryption method IDs 2021 are assigned to the encryption method ID storage units S17 and 618.

An encryption key generation method 2024 represents an encryption key generation method when the key generation unit 704 generates an encryption key. In this embodiment, the encryption key generation method 2024 indicates methods A and B, and the "generation method" indicates elements (information) to be used when generating an encryption key. Examples of the elements are information such as the tenant ID, user ID, and encryption ID. It is possible to define a combination of these elements to be used to generate a key.

For example, a job such as scanning closed in a tenant transmits no data outside the tenant, so the problem assumed in this application does not arise. Therefore, a generation method (a combination of elements) for generating an encryption key for the scan job is defined as, for example, the tenant ID and fixed key. On the other hand, a FAX job transmits data outside a tenant, so the problem assumed in this application arises. Accordingly, a generation method (a combination of elements) for generating an encryption key for the FAX job is defined as, for example, the tenant ID, encryption ID, and fixed key. Note that when preventing a transmission error of another data in the same tenant is the only purpose, an encryption key need only be formed by using an encryption ID unique to the job. However, the security can further be improved by combining not only the encryption ID but also the tenant ID and fixed key in order to generate an encryption key.

(Retry Determination Process)

Figure 19:
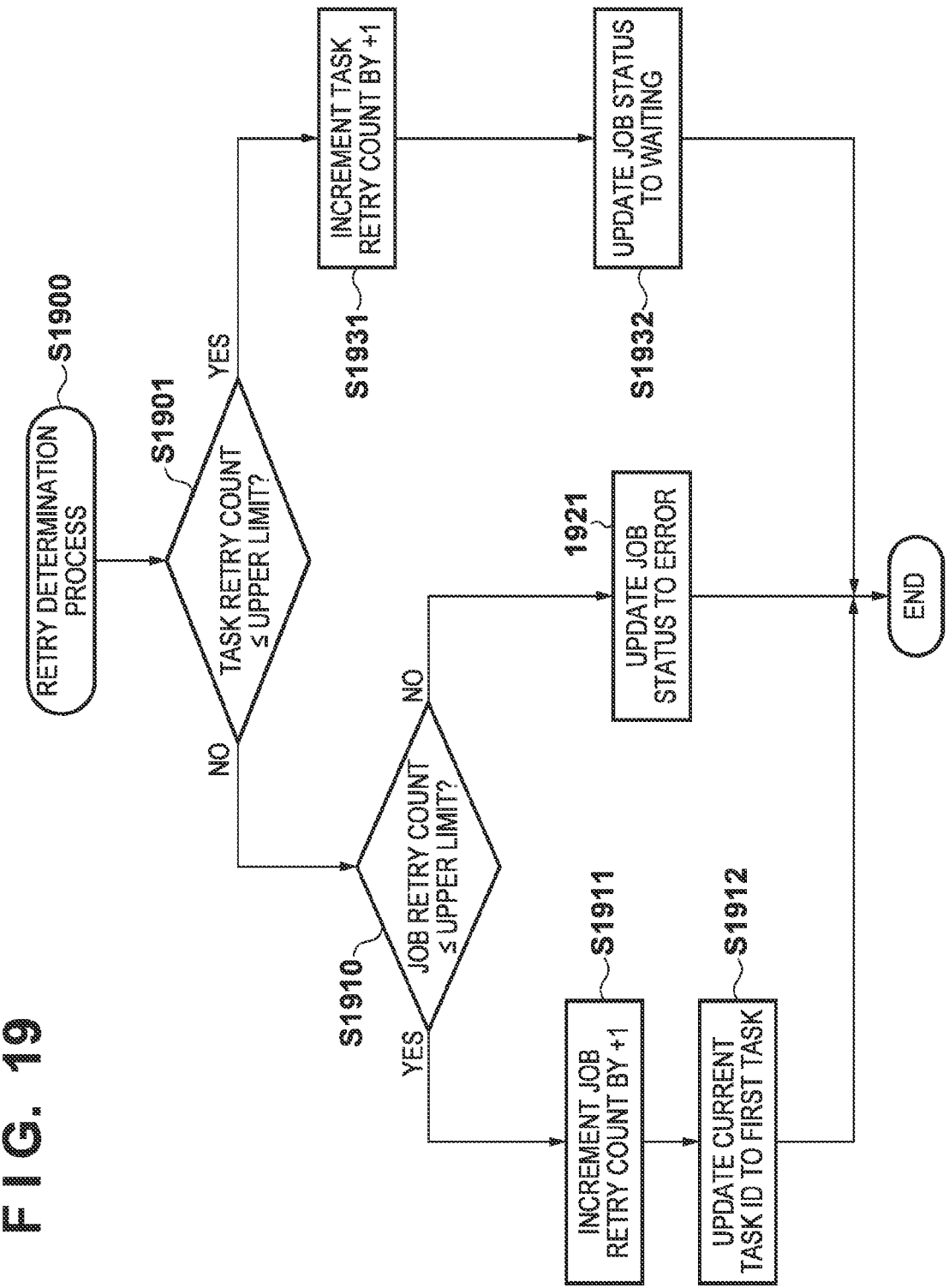
FIG. 19 is a flowchart showing the procedure of a task retry determination process.

The retry determination process for a task and job will be explained below with reference to FIG. 19. If the processing of the task service servers 103 to 105 has failed for some cause, the task service servers 103 to 105 notify the flow service server 102 of the failure of the task processing. In this case, the retry determination unit 1807 determines whether to retry the task, retry the job, or terminate the processing by regarding the job as a failure. FIG. 19 is a flowchart showing the determination process of the retry determination unit 1807.

In step S1901, the retry determination unit 1807 compares the current task retry count 2011 with the task retry count upper limit 1703 corresponding to the current task ID 2004, and determines whether the current task retry count is equal to or smaller than the upper limit. If the current task retry count is equal to or smaller than the upper limit (YES in step S1901), the retry determination unit 1807 increments the current task retry count 2011 in step S1931. Then the retry determination unit 1807 changes the status 2005 of the job to waiting (0) in step S1932. By thus changing the job information management DB 1802, the task service servers 103 to 105 can reacquire the task and retry the processing.

If the current task retry count is larger than the upper limit (NO in step S1901), the retry determination unit 1807 determines whether the job retry count is equal to or smaller than the upper limit in step S1910. In this step, the retry determination unit 1807 compares the job retry count upper limit 2009 with the job retry count 2010.

If the job retry count is equal to or smaller than the upper limit (YES in step S1910), the retry determination unit 1807 increments the job retry count 2010 in step S1911. Subsequently, in step S1912, the retry determination unit 1807 accesses the route information management DB 1501 by using the route ID 2002 and acquires the first task ID. Then, the retry determination unit 1807 updates the current task ID 2004 to the ID of the first task. By thus changing the ID, the processing is retried from the first task, that is, the job is retried.

If the retry count is larger than the upper limit (NO in step S1910), the retry determination unit 1807 updates the status 2005 of the job to error (2) in step S1921, thereby regarding that the job has failed.

[Temporary File Management Service Server]

The temporary file management service server 1403 is a service server for storing files and managing the paths of the storage destinations in accordance with requests from the scan service server 101, FAX service server 100, and task service servers 103 to 105. When receiving a file acquisition request from the task service server 103, 104, or 105, the temporary file management service server 1403 returns binary data of a saved file to the task service server 103, 104, or 105. Also, when receiving a file delete request from the task service server 103, 104, or 105 or the job management service server 1402, the temporary file management service server 1403 deletes a saved file.

Figure 21:
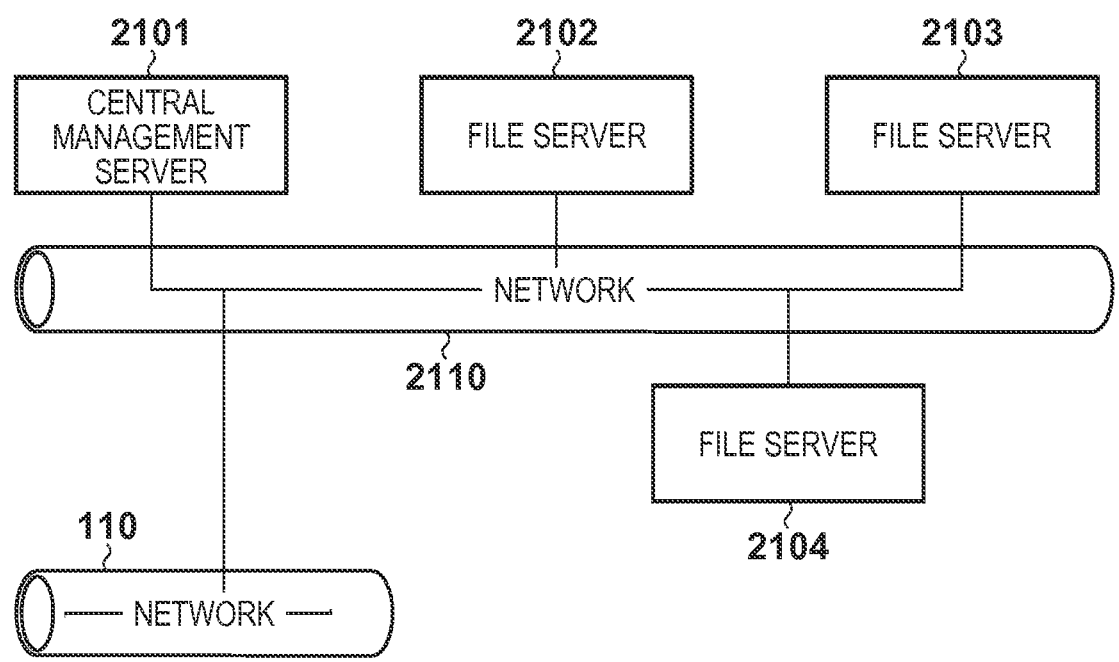
FIG. 21 is a view showing the overall arrangement of a temporary file management service server group.

FIG. 21 is a view showing an example of the overall arrangement of the temporary file management service server 1403. The overall arrangement of the temporary file management service server includes a central management server 2101 and file servers 2102 to 2104, and these servers are connected across a network 2110. The network 2110 is connected to the network 110. The network 2110 is a communication network capable of transmitting/receiving data similar to that of the network 110. The central management server 2101 is generally executed on a server computer. The file servers 2102 to 2104 are generally executed on server computers, and have functions of saving, deleting, and acquiring electronic data as needed. Note that the arrangement shown in FIG. 21 is presented as the overall arrangement of the temporary file management service server according to this embodiment, but the present invention is not limited to this arrangement, and it is also possible to physically configure the server by using a given number of devices.

[Central Management Server]

Figure 22:
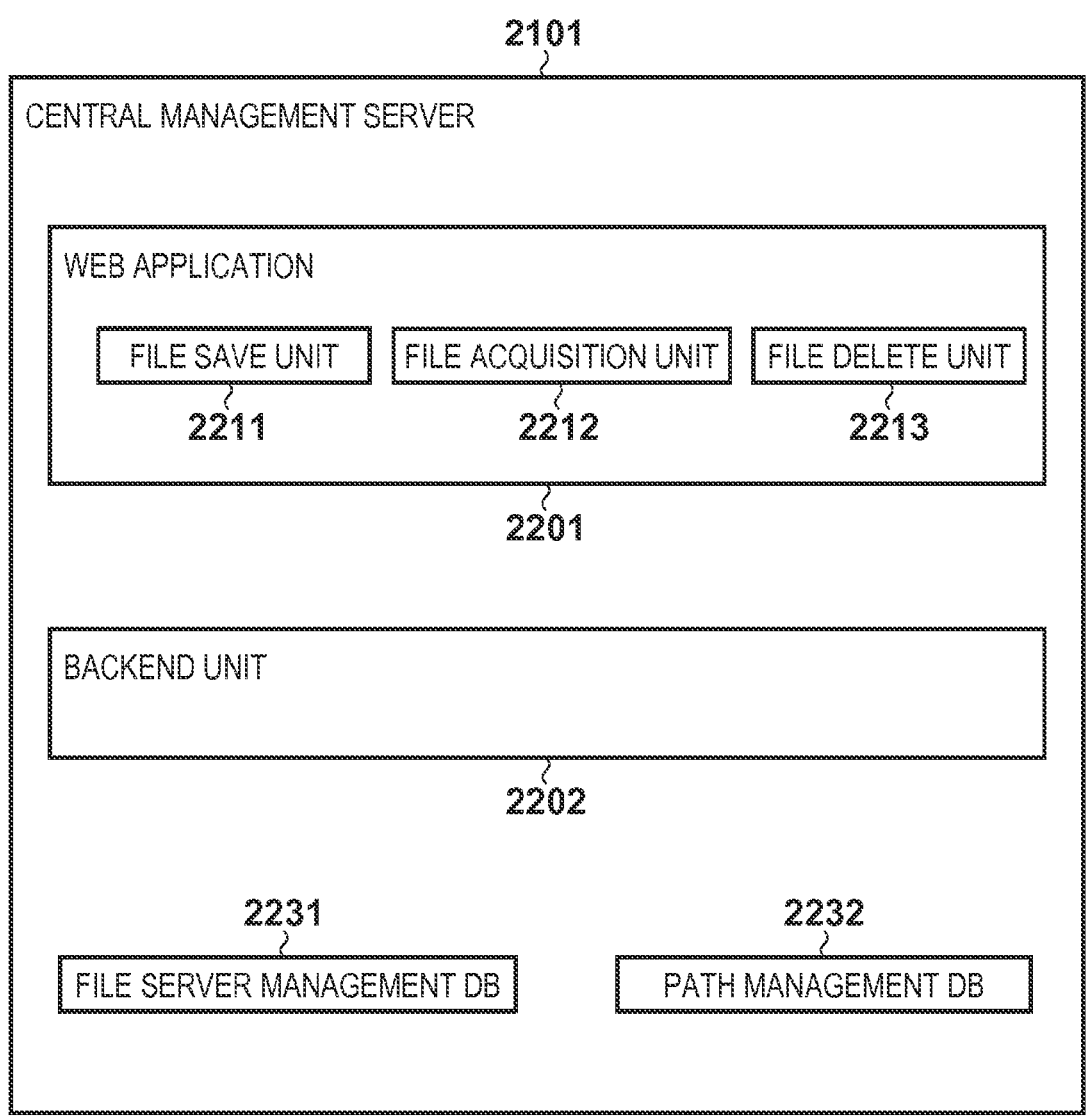
FIG. 22 is a view showing the system configuration of a central management server.

FIG. 22 is a view showing the system configuration of the central management server 2101 according to this embodiment. The central management server 2101 includes a web application unit 2201, backend unit 2202, file server management DB 2231, and path management DB 2232. The web application unit 2201 provides a temporary file managing function. The backend unit 2202 implement functions of, for example, saving, acquiring, and deleting files with respect to the file servers 2102 to 2104.

The file server management DB 2231 manages information pertaining to the file servers 2102 to 2104 as file storage destinations. FIG. 23A shows examples of data managed by the file server management DB 2231. An ID 2301 is information for uniquely identifying a file server in the temporary file management service server 1403. A host name 2302 indicates an address unique to a file server on the network 2110, and is used when the web application unit 2201 accesses the file servers 2102 to 2104 via the backend unit 2202.

An active flag 2303 is a truth value indicating whether the web application unit 2201 can communicate with a file server existing in the host name 2302 via the backend unit 2202. The active flag 2303 takes a value "True" when communication is possible, and a value "False" when communication is impossible. A shared folder name 2304 is the name of a shared folder formed on the file servers 2102 to 2104. The full path of a shared folder formed on the file servers 2102 to 2104 can be obtained from the host name 2302 and shared folder name 2304.

The path management DB 2232 manages information pertaining to temporary files and folders saved in the file servers 2102 to 2104, which are managed by the temporary file management service server 1403. In this specification, files and folders managed by the temporary file management service server 1403 will collectively be called "entities". FIG. 23B shows examples of data managed by the path management DB 2232. A file ID 2310 is information for uniquely identifying an entity in the file servers 2102 to 2104. File group ID 2311 is information for grouping entities by a related job. Accordingly, entities generated by the same job have the same file group ID 2311.

A task ID 2312 takes, as a value, the task ID of a task related to each entity, "Folder" representing a folder, or "init" representing a file stored by a request from the scan service server 101. In this specification, files stored in response to requests from the scan service server 101 and FAX service server 100 are called "initial data". That is, the initial data indicates data when a job instruction is received. In other words, the initial data is data for which a task forming the job is unprocessed in any task service server.

A No 2313 indicates the file number of a file generated by each task. A path 2314 indicates the full path of the storage destination of an entity, and is used when the web application unit 2201 accesses the entity via the backend unit 2202. A host name 2315 indicates the host name of a file server as the storage destination of each entity. A formation date 2316 and effective period 2317 respectively indicate the formation date and effective period of each entity. A tenant ID 2318 represents the tenant ID of a tenant to which the holder of each entity belongs.

[File Server]

Figure 24:
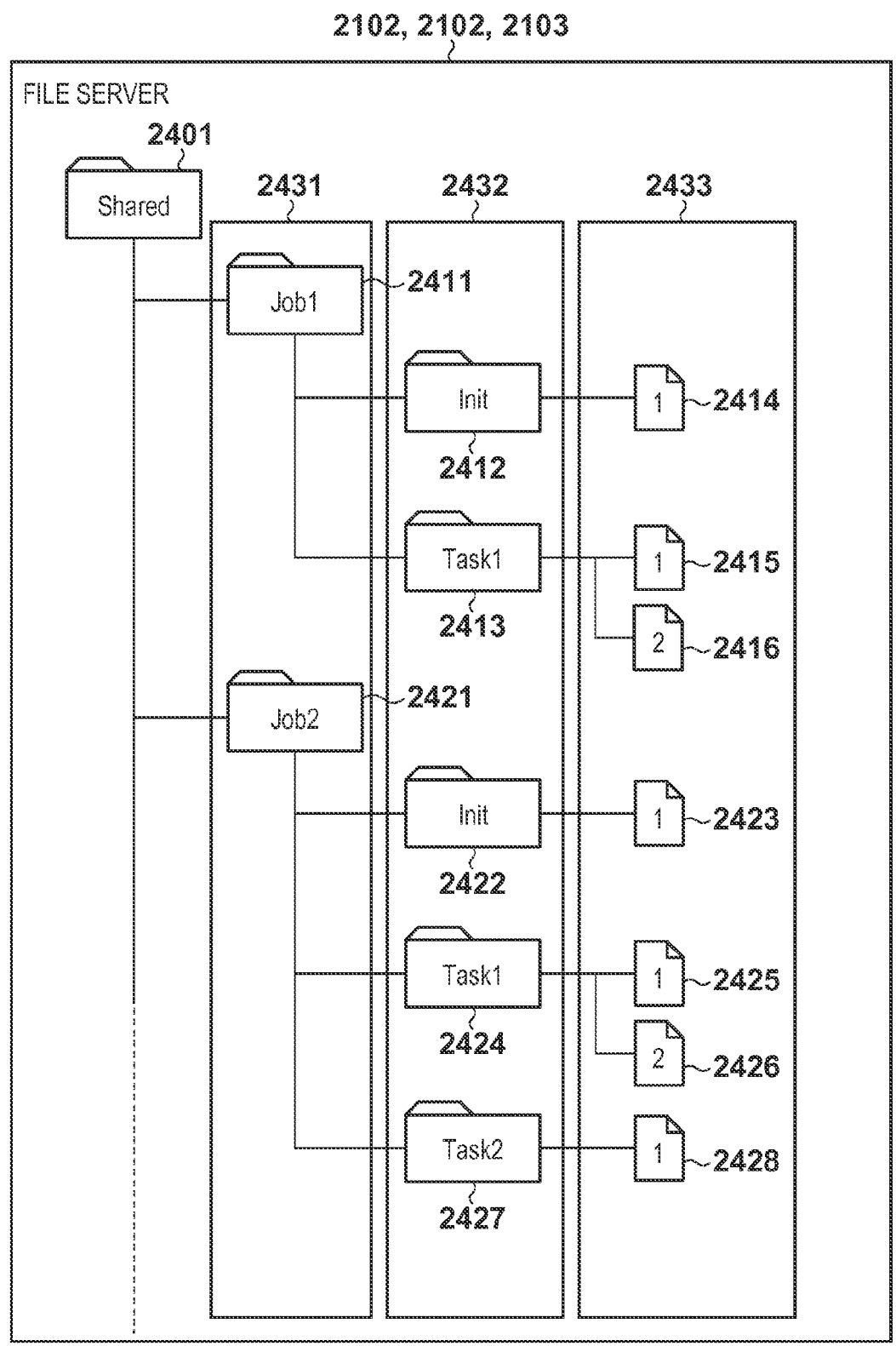
FIG. 24 is a view showing the hierarchical structure of folders of file servers used in the temporary file management service server group.

The file servers 2102 to 2104 store files to be managed by the temporary file management service server 1403. FIG. 24 is a conceptual view showing the hierarchical structure of folders in the file servers 2102 to 2104.

A shared folder 2401 is shared and accessible by the web application unit 2201 via the backend unit 2202. At least one shared folder 2401 exists on each server, and matches the shared folder name 2304 in the file server management DB 2231. In this embodiment, the depth of the shared folder 2401 is regarded as "0". The folder names of folders 2411 and 2421 in a folder group 2431 having a depth "1" immediately below the shared folder 2401 correspond to the file group ID 2311. Also, the folder names of folders 2412, 2413, 2422, 2424, and 2427 in a folder group 2432 having a depth "2" immediately below the folders 2411 and 2421 correspond to the task ID 2312. Temporary files to be managed by the temporary file management service server are saved immediately below the folder group 2432 having a depth "2". The file names of these temporary files correspond to the No 2313 in the path management DB 2232.

[Central Management Server]

The functions of the web application unit 2201 of the central management server 2101 will now be explained. A file save unit 2211 implements a function of multiplexing files and saving the multiplexed files in the file servers 2102 to 2104, in accordance with requests from the scan service server 101, FAX service server 100, and task service servers 103 to 105. The scan service server 101, FAX service server 100, and task service servers 103 to 105 as the request sources can designate an integer of 1 or more as the multiplicity. When the multiplicity is 1, for example, files are saved without being multiplexed. When the multiplicity is 2, the same file is copied to two files, and these two files are saved in shared folders of individual file servers. The maximum value of the multiplicity is the number of shared folders existing in the file servers 2102 to 2104. Values larger than this maximum value are ignored.

When receiving an initial data save request from the scan service server 101 or FAX service server 100, the file save unit 2211 selects a file server as a save destination from presently operating file servers. In this step, the file save unit 2211 selects file servers based on the designated multiplicity in order from a file server having fewest folders in the folder group 2431 having a depth "1". This is to prevent data from being collectively saved in a given file server, thereby making the capacities of the file servers 2102 to 2104 as uniform as possible. The initial data save request from the scan service server 101 or FAX service server 100 contains information of the multiplicity, task ID, and No. The file save unit 2211 generates a file group ID, and generates a save destination file path based on the file group ID, task ID, and No. Then, the file save unit 2211 executes a file saving process (to be described later).

When the file save unit 2211 receives a file save request from the task service server 103, 104, or 105, this request contains information of the multiplicity, file group ID, task ID, and No. The file save unit 2211 specifies file servers in which initial data having the same file group ID as that contained in the received request is saved, from the information stored in the path management DB 2232. The file save unit 2211 selects file servers as file save destinations at random from the specified file servers based on the multiplicity. The file save unit 2211 determines a save destination file path for each selected file server based on the file group ID, task ID, and No, and executes the file saving process.

In this file saving process, the file save unit 2211 transmits the save destination file path and file data to the backend unit 2202. The backend unit 2202 checks whether communication with the save destination file server is possible. If communication is possible, the backend unit 2202 saves the file in the save destination file path. To multiplex the file and save the multiplexed file, the backend unit 2202 repeats the above-mentioned processing based on the multiplicity. When all files have completely be saved, the backend unit 2202 returns the results to the file save unit 2211. The file save unit 2211 adds entries pertaining to the save destination file path in the path management DB 2232 in accordance with the multiplicity.

Only when the initial data is saved after the file saving process is complete, the file group ID is returned to the scan service server 101 or FAX service server 100 as the request source.

A file acquisition unit 2212 returns files saved in the file servers 2102 to 2104 to the task service servers 103 to 105 in response to requests from the task service servers 103 to 105. When receiving a request from the task service server 103, 104, or 105, the file acquisition unit 2212 inquires of the path management DB 2232 based on information of the file group ID, task ID, and No contained in the request, and acquires the file path of the storage destination. The file acquisition unit 2212 transmits the storage destination file path to the backend unit 2202. The backend unit 2202 checks whether communication with a file server of the storage destination is possible. If communication is possible, the backend unit 2202 returns file data to the file acquisition unit 2212. The file acquisition unit 2212 returns the data returned from the backend unit 2202, to the task service server 103, 104, or 105.

A file delete unit 2213 deletes entities stored in the file servers 2102 to 2104 in response to requests from the task service servers 103 to 105 and job management service server 1402. When receiving a request from the task service server 103, 104, or 105 or the job management service server 1402, the file delete unit 2213 inquires of the path management DB 2232 based on information of the file group ID, task ID, and No contained in the request.

The file delete unit 2213 transmits the acquired entity path of the storage destination to the backend unit 2202. The backend unit 2202 checks whether communication with a file server of the storage destination is possible. If communication is possible, the backend unit 2202 deletes the entity. When completing the deletion, the backend unit 2202 returns the result to the file delete unit 2213. When the deletion of the entity is successful, the file delete unit 2213 deletes an entry pertaining to the deleted entity from the path management DB 2232.

As described above, this embodiment can control the encryption method and the method of generating a key for encryption in accordance with the processing contents of a job. As a consequence, in a job for transmitting data outside a tenant, such as a job input by the FAX service server 100, an encryption key is generated using an encryption ID unique to the job. This makes it possible to prevent the problem that data of a different job belonging to the same tenant is transmitted outside the tenant by mistake.

<Second Embodiment>

In the first embodiment, if the task service servers 103 to 105 have failed in decrypting data in steps S1225, S1236, S1321, and S1336, the retry determination unit 1807 performs retry control so as to reexecute the decryption process in accordance with the retry determination process shown in FIG. 19. However, if the cause of a task failure is the failure of data decryption, data (a file) itself may be wrong as a decryption target. If this is the case, data decryption fails again even when the task is retried. Accordingly, this retry process wasting resources is unnecessary.

In this embodiment, if the cause of retry is a decryption failure, task service servers 103 to 105 do not perform the retry by using the same data, thereby preventing a waste of resources. In this embodiment, contents of retry control are switched in accordance with the state of decrypted target data. More specifically, when a task uses initial data, that is, when the decryption of initial data is unsuccessful, the initial data is multiplexed, so the task is retried by using another data (another multiplexed data) different from the unsuccessfully decrypted data. On the other hand, when a task uses data other than initial data, that is, when the decryption of data obtained by processing already performed by another task service server is unsuccessful, no decryptable data exists in the present task. Therefore, retry is performed from an immediately preceding task. Note that the processes described in the first embodiment are executed in portions not described in the second embodiment.

FIGS. 25A, 25B, and 25C show the procedure of task processing for retry when the processing of the task service server is unsuccessful due to a decryption failure after a job is input from the scan service server 101 or FAX service server 100. Note that FIGS. 25A-25C do not show failure processing when a job is retried and when the retry count upper limit of a job or task is reached.

First, the procedure of job processing when the task service server 103 using initial data has failed due to file decryption will be explained.

When the processing is started, the task service server 103 transmits a processing target job acquisition request to the job management service server 1402 in step S2501. The job management service server 1402 returns a processing target job to the request in step S2502.

Subsequently, the task service server 103 determines in step S2503 whether the job acquired in step S2502 is a retry execution job caused by a decryption failure. Note that although not shown in FIGS. 25A-25C, whether the job is a retry execution job caused by a decryption failure is determined by the job information management DB 1802 shown in FIG. 20A by managing the path of a file unsuccessfully decrypted as one element of job information.

If it is determined that the job is not a retry execution job caused by a decryption failure (NO in step S2503), the task service server 103 transmits a processing target file acquisition request to the central management server 2101 (step S2504). In step S2505, the central management server 2101 transmits a file read request to the file server 2102. In step S2506, the file server 2102 returns the requested file to the task service server 103.

If it is determined that the job is a retry execution job caused by a decryption failure (YES in step S2503), the task service server 103 transmits a processing target file acquisition request to the central management server 2101 (step S2507). In this step, the task service server 103 requests a file (multiplexed file) different from the unsuccessfully decrypted file.

In step S2508, the central management server 2101 determines whether a file (multiplexed file) different from the unsuccessfully decrypted file exists in any of the file servers 2102 to 2104.

If no different file exists (NO in step S2508), the central management server 2101 returns a response indicating the nonexistence of a file to the task service server 103. In step S2511, the task service server 103 notifies the job management service server 1402 of the task failure. In step S2512, the job management service server 1402 performs job failure processing, updates the status 2005 of the job information management DB 1802 to error (2), and terminates the process.

If a different file exists (YES in step S2508), the process advances to step S2509, and the central management server 2101 transmits a file read request to a file server (in this explanation, the file server 2103) in which the different file exists. In step S2510, the file server 2103 returns the file to the task service server 103. In step S2513, the task service server 103 decrypts the returned file.

In step S2514, the task service server 103 determines whether the file decryption is successful. If the file decryption is unsuccessful (NO in step S2514), the task service server 103 performs a failure notification process for the job management service server 1402 in step S2515. In step S2516, the job management service server 1402 having received the notification writes the path of the unsuccessfully decrypted file in the job information management DB 1802. In step S2517, the job management service server 1402 performs a retry determination process. Note that this retry determination process shown in FIGS. 25A-25C is the same as that shown in FIG. 19 of the first embodiment, so a detailed explanation will be omitted.

Referring to FIG. 19, if the task retry count is equal to or smaller than the upper limit in step S1901, the process returns to step S2501, and the task service server 103 performs the retry process again. Note that FIGS. 25A-25C do not show a case in which the task retry count is larger than the upper limit in step S1901.

If the file decryption is successful (YES in step S2514), the task service server 103 performs task processing in step S2521. In step S2522, the task service server 103 decrypts the task processing result file. In step S2523, the task service server 103 transmits a task processing result file save request to the central management server 2101. In step S2524, the central management server 2101 having received the save request transmits a task processing result file write request to the file server 2103. In step S2525, the file server 2103 performs write processing of the task processing result file. After the task processing result file saving process is complete, the task service server 103 notifies the job management service server 1402 of normal termination of the task in step S2526.

In step S2527, the job management service server 1402 updates the current task ID 2004 in the job information management DB 1802. In step S2528, the job management service server 1402 sets the current task retry count 2011 to "0".

The foregoing is the procedure of job processing when the task service server 103 using initial data has failed due to file decryption.

Next, the procedure of job processing when the task service server 104 using processing result data of another task (in this explanation, a task processed by the task service server 103) has failed due to file decryption will be explained. Note that the procedure is the same when the task service server 105 performs the processing instead of the task service server 104.

In step S2531, the task service server 104 transmits a processing target job acquisition request to the job management service server 1402. In step S2532, the job management service server 1402 returns a processing target job to the acquisition request.

Then, in step S2533, the task service server 104 transmits a processing target file acquisition request to the central management server 2101. In step S2534, the central management server 2101 transmits a file read request to the file server 2102. In step S2535, the file server 2102 returns the requested file to the task service server 104. In step S2536, the task service server 104 decrypts the returned file.

In step S2541, the task service server 104 determines whether the file decryption is successful. If the file decryption is unsuccessful (NO in step S2541), the task service server 104 performs a failure notification process for the job management service server 1402 in step S2542. In step S2543, the job management service server 1402 having received the notification updates the current task ID 2004 in the job information management DB 1802 to an immediately preceding task (in this explanation, a task ID corresponding to the task service server 103). By thus returning to the immediately preceding task, the task service server 104 reacquires a normal file immediately preceding the unsuccessfully decrypted file, and decrypts the normal file. This may make the decryption successful, and the processing continuable.

In step S2544, the job management service server 1402 performs a retry determination process. If the task retry count is equal to or smaller than the upper limit (YES in step S1901), the current task retry count 2011 is set to 0 in step S2545. After that, the process returns to step S2501, and the task service server 103 performs the retry process again. Also, as described previously, FIGS. 25A-25C do not explain a case in which the task retry count is larger than the upper limit.

If the file decryption is successful (YES in step S2541), the task service server 104 or 105 performs task processing in step S2551. Then, in step S2552, the task service server 104 or 105 notifies the job management service server 1402 of normal termination of the task. After that, in step S2553, the job management service server 1402 updates the status 2005 in the job information management DB 1802 to normal termination (−1).

The foregoing is the procedure of the job processing when the task service server 104 or 105 using processing result data of another task has failed due to file decryption.

In addition to the effect of the first embodiment, this embodiment makes it possible to effectively use the resources such as the memories and CPU without performing any unnecessary retry process when the processing of a task service has failed due to decryption.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176373, filed Aug. 8, 2012, which is hereby incorporated by reference herein in its entirety.

What is claimed is:

1. A job processing system for processing a job including one or a plurality of tasks, the job processing system comprising:
   a service server which receives designation of a job;
   a job management service server which manages a job generated by receiving the designation; and
   a plurality of task processing service servers which process one or a plurality of tasks forming the job, in order to execute processing based on the job,
   said job management service server comprising:
      a storage that stores a computer program; and
      a hardware processor that executes the computer program to control the job management service server to function as:
         a holding unit that holds, for each of said task processing service servers, encryption information defining a method of encrypting and to decrypt a file corresponding to the job, and information which is used when generating a key for use in encryption and decryption; and
         a specification unit that specifies, when receiving an encryption information acquisition request from a task processing service server, encryption information for a service server of a job corresponding to an encrypted file to be decrypted by a task processing service server, and
   each said task processing service server comprising:
      a storage that stores a computer program; and
      a hardware processor that executes the computer program to control the task processing service server to function as:
         a decryption unit that receives the encryption information specified by said specification unit, and decrypts the encrypted file using a method and information defined in the encryption information;
         an encryption unit that executes task processing for a file decrypted by the decryption unit, and encrypts data after the task processing using the method and information defined in the encryption information; and
         a notification unit that, after the task processing has been completed and the data has been encrypted by the encryption unit, notifies the job management service server of completion of the task processing,
   wherein said job management service server manages the job such that, after the task processing and encryption by the encryption unit of one task processing service center, another task processing service server of the plurality of task processing service servers decrypts the data and executes task processing for the decrypted data.

2. The system according to claim 1, wherein the job is managed for each tenant to which a user having designated the job belongs.

3. The system according to claim 2, wherein
   the job is a scan job or FAX job, and
   the encryption information is defined for the scan job to form a key by using tenant information for uniquely identifying a tenant, and
   defined for the FAX job to form a key by using the tenant information and job information for uniquely identifying a job.

4. The system according to claim 1, wherein
   the job processing system further comprises a file management service server which manages a file corresponding to the job,
   said file management service server is provided by a plurality of file servers, and
   the plurality of file servers perform multiplexing by holding files corresponding to the same job.

5. The system according to claim 4, wherein if said decryption unit has failed in decrypting a file and the file is initial data in a state in which a job is designated,
   said task processing service server reacquires a multiplexed file of the file from another file server of the plurality of file servers, and
   said decryption unit decrypts the reacquired multiplexed file.

6. The system according to claim 4, wherein if a file unsuccessfully decrypted by said decryption unit is a file obtained by processing performed by another task processing service server,
   said job management service server returns a task indicating a current processing target to an immediately preceding task of the other task processing service server.

7. A job processing method of a job processing system for processing a job including one or a plurality of tasks, wherein the job processing system comprises:
   a service server which receives designation of a job;
   a job management service server which manages a job generated by receiving the designation; and
   a plurality of task processing service servers which process one or a plurality of tasks forming the job, in order to execute processing based on the job,
   wherein, in the job management service server, the method comprises:
      holding, for each of the task processing service servers, encryption information defining a method of encrypting and decrypting a file corresponding to the job, and information which is used when generating a key for use in encryption and decryption; and
      specifying, when receiving an encryption information acquisition request from a task processing service server, encryption information for a service server of a job corresponding to an encrypted file to be decrypted by a task processing service server, and
   wherein, in each task processing service server, the method comprises:
      receiving the encryption information specified in the specifying step, decrypting the encrypted file using a method and information defined in the encryption information;

executing task processing for a file decrypted in the decrypting step;

encrypting data after the task processing using the method and information defined in the encryption information; and notifying, after the task processing has been completed and the data has been encrypted in the encrypting step, the job management service server of completion of the task processing, wherein after the task processing and encrypting of data has been completed in the encrypting step by one task processing service server, another task processing service server of the plurality of task processing service servers decrypts the data and executes task processing for the decrypted data.

8. The method according to claim 7, wherein the job is managed for each tenant to which a user having designated the job belongs.

9. The method according to claim 8, wherein
the job is a scan job or FAX job, and
the encryption information is defined for the scan job to form a key by using tenant information for uniquely identifying a tenant, and
defined for the FAX job to form a key by using the tenant information and job information for uniquely identifying a job.

10. The method according to claim 7, wherein
the job processing system further comprises a file management service server which manages a file corresponding to the job,
the file management service server is provided by a plurality of file servers, and
the plurality of file servers perform multiplexing by holding files corresponding to the same job.

11. The method according to claim 10, wherein if decryption of a file has failed in the decrypting step and the file is initial data in a state in which a job is designated,
the task processing service server reacquires a multiplexed file of the file from another file server of the plurality of file servers, and
the reacquired multiplexed file is decrypted in the decrypting step.

12. The method according to claim 10, wherein if a file unsuccessfully decrypted in the decrypting step is a file obtained by processing performed by another task processing service server,
the job management service server returns a task indicating a current processing target to an immediately preceding task of the other task processing service server.

13. A non-transitory computer-readable medium storing a program for a job processing system comprising a service server which receives designation of a job, a job management service server which manages a job generated by receiving the designation, and a plurality of task processing service servers which process one or a plurality of tasks forming the job, in order to execute processing based on the job, the program causing
said job management service server to function as:
a holding unit that holds, for each of said task processing service servers, encryption information defining a method of encrypting and to decrypt a file corresponding to the job, and information which is used when generating a key for use in encryption and decryption; and
a specification unit that specifies, when receiving an encryption information acquisition request from a task processing service server, encryption information for a service server of a job corresponding to an encrypted file to be decrypted by said task processing service server,
and causing each task processing service server to function as
a decryption unit that receives the encryption information specified by said specification unit, and decrypts the encrypted file using a method and information defined in the encryption information;
an encryption unit that executes task processing for a file decrypted by the decryption unit, and encrypts data after the task processing using the method and information defined in the encryption information; and
a notification unit that, after the task processing has been completed and the data has been encrypted by the encryption unit, notifies the job management service server of completion of the task processing,
wherein the job management service server manages the job such that, after the task processing and encryption by the encryption unit of one task processing service center, another task processing service server of the plurality of task processing service servers decrypts the data and executes task processing for the decrypted data.

14. The medium according to claim 13, wherein the job is managed for each tenant to which a user having designated the job belongs.

15. The medium according to claim 14, wherein
the job is a scan job or FAX job, and
the encryption information is defined for the scan job to form a key by using tenant information for uniquely identifying a tenant, and
defined for the FAX job to form a key by using the tenant information and job information for uniquely identifying a job.

16. The medium according to claim 13, wherein
the job processing system further comprises a file management service server which manages a file corresponding to the job,
said file management service server is provided by a plurality of file servers, and
the plurality of file servers perform multiplexing by holding files corresponding to the same job.

17. The medium according to claim 16, wherein if said decryption unit has failed in decrypting a file and the file is initial data in a state in which a job is designated,
said task processing service server reacquires a multiplexed file of the file from another file server of the plurality of file servers, and
said decryption unit decrypts the reacquired multiplexed file.

18. The medium according to claim 16, wherein if a file unsuccessfully decrypted by said decryption unit is a file obtained by processing performed by another task processing service server,
said job management service server returns a task indicating a current processing target to an immediately preceding task of the other task processing service server.

* * * * *